(12) United States Patent
Kataoka

(10) Patent No.: US 6,958,468 B2
(45) Date of Patent: Oct. 25, 2005

(54) BEAM ROTATION ANGLE DETECTING APPARATUS, ROTATION DETECTING APPARATUS AND BEAM ROTATION ANGLE DETECTING METHOD

(75) Inventor: Kenichi Kataoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/659,275

(22) Filed: Sep. 11, 2003

(65) Prior Publication Data

US 2005/0098715 A1  May 12, 2005

Related U.S. Application Data

(62) Division of application No. 09/685,930, filed on Oct. 11, 2000, now Pat. No. 6,642,507.

(30) Foreign Application Priority Data

Oct. 12, 1999 (JP) .................................. 11-289413
Sep. 14, 2000 (JP) ............................. 2000-280036

(51) Int. Cl.$^7$ ............................................... G01D 5/34
(52) U.S. Cl. ............................................... 250/231.13
(58) Field of Search ............................... 250/235, 236, 250/231.13–18; 356/614

(56) References Cited

U.S. PATENT DOCUMENTS

| 4,760,436 A | * | 7/1988 | Yi Zi ........................... 257/465 |
| 5,428,217 A | * | 6/1995 | Nakajima ................. 250/214.1 |
| 5,483,059 A | | 1/1996 | Igaki et al. |
| 5,640,377 A | | 6/1997 | Watanabe et al. |
| 6,031,223 A | * | 2/2000 | Morishita ............... 250/231.13 |

FOREIGN PATENT DOCUMENTS

| JP | 6-235622 | 8/1994 |
| JP | 6-347289 | 12/1994 |

* cited by examiner

Primary Examiner—David Porta
(74) Attorney, Agent, or Firm—Fitzpatrick, Cella, Harper & Scinto

(57) ABSTRACT

A beam rotation angle detecting apparatus includes a light receiving portion for detecting the incidence positions of at least two beams moving on concentric circles while describing a circle or an arc, and an arithmetic system for calculating and outputting the angle between a straight line linking at least two incidence positions detected by the light receiving portion together and a predetermined reference line.

31 Claims, 24 Drawing Sheets

BEAM ROTATION ANGLE DETECTING APPARATUS, ROTATION DETECTING APPARATUS AND BEAM ROTATION ANGLE DETECTING METHOD

This application is a divisional of Ser. No. 09/685,930 filed on Oct. 11, 2000 now U.S. Pat. No. 6,642,507.

BACKGROUND OF THE INVENTION

1. Field of the Invention

This invention relates to a beam rotation angle detecting apparatus used in a rotary encoder, a linear encoder or the like to optically effect position detection, and a rotation detecting apparatus and a beam rotation angle detecting method.

2. Related Background Art

Heretofore, to obtain the rotation angle of a beam rotating while forming a track as a circle, as disclosed in Japanese Patent Application Laid-Open No. 6-235622 and Japanese Patent Application Laid-Open No. 6-347289, the light receiving position thereof has been detected by a circular ring-shaped or circular light receiving sensor for receiving a beam.

Also, U.S. Pat. No. 4,760,436, discloses that two beams are received by independent arcuate light receiving sensors, and these sensors are used properly in conformity with the rotation angle to thereby detect a round of continuous angle.

In the above-described beam rotation angle detecting apparatus, however, there has been the problem that the rotation angle of a beam cannot be accurately detected under the influence of the deviation between the center of rotation of the beam and the center of the light receiving sensor.

SUMMARY OF THE INVENTION

It is an object of the present invention to solve such a problem peculiar to the prior art and provide a beam rotation angle detecting apparatus which can accurately detect the rotation angle of a beam, and a rotation detecting apparatus and a beam rotation angle detecting method.

Other objects of the present invention will become apparent from the following description of some embodiments of the invention.

DESCRIPTION OF THE PREFERRED EMBODIMENTS

Embodiments of the present invention will hereinafter be described with reference to the drawings.

Figure 1:
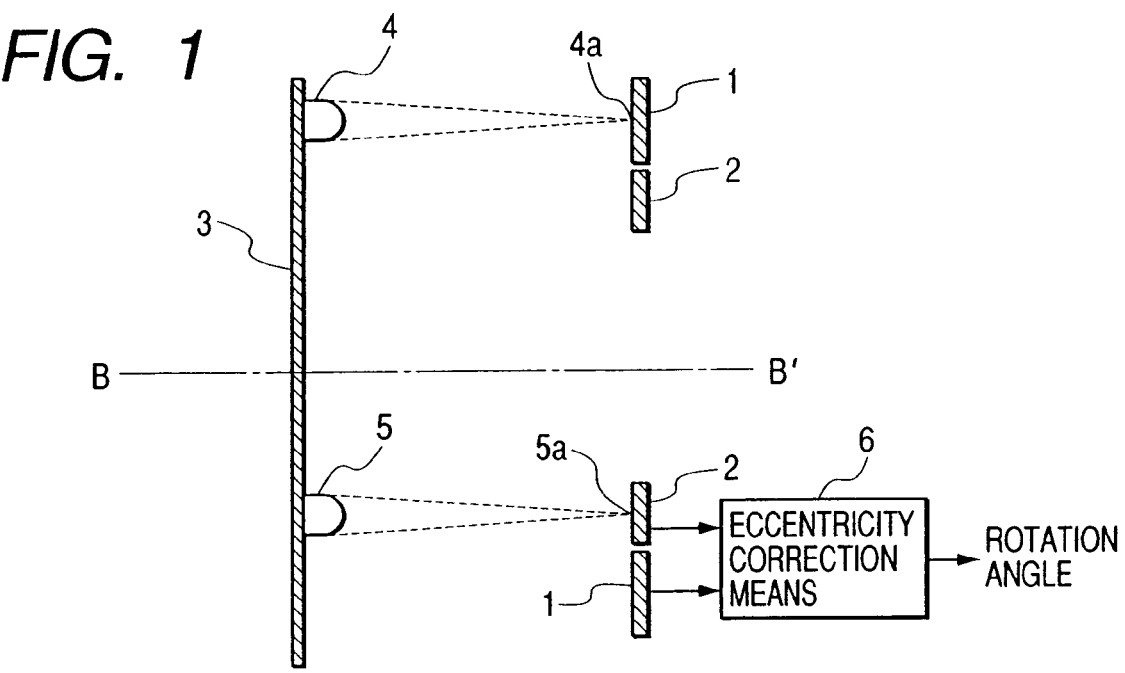
FIG. 1 schematically shows the construction (the cross-section 1—1 of FIG. 2) of a rotation detecting apparatus including a beam rotation angle detecting apparatus according to a first embodiment of the present invention.
Figure 2:
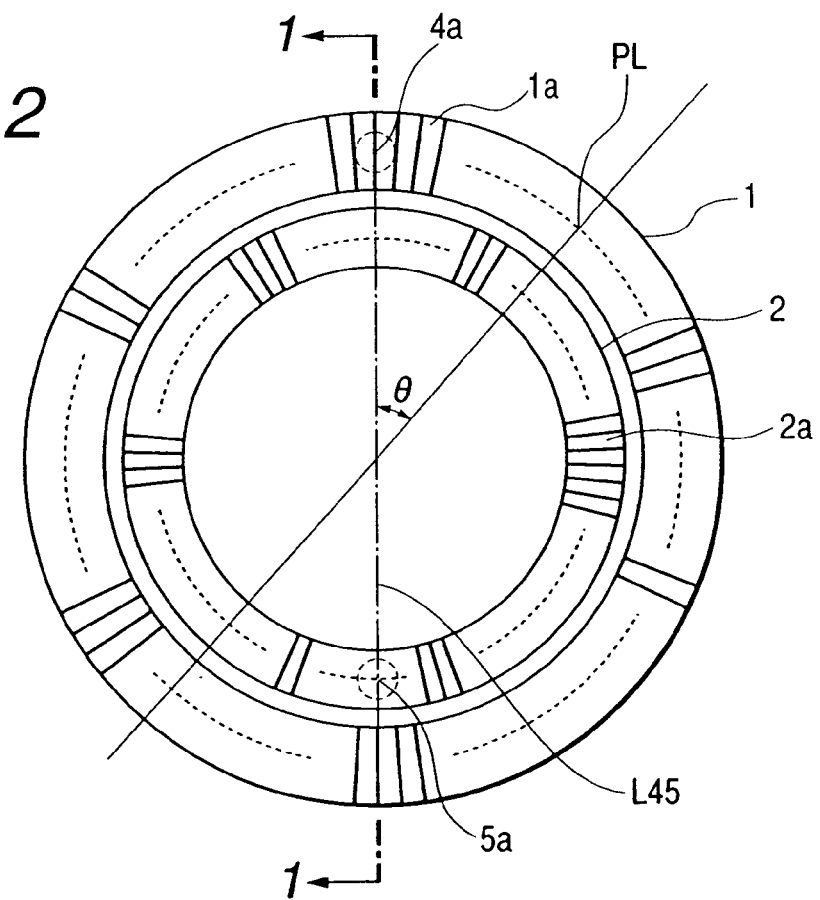
FIG. 2 is a plan view showing the circular ring-shaped light receiving elements of the rotation detecting apparatus of FIG. 1.

FIG. 1 shows the construction (the cross-section 1—1 of FIG. 2) of a rotation detecting apparatus according to a first embodiment of the present invention, and FIG. 2 is a plan view showing the light receiving sensors of FIG. 1.

In FIG. 1, reference numerals 1 and 2 designate light receiving sensors which are circular ring-shaped light receiving means having the same center, and as shown in FIG. 2, the light receiving sensors 1 and 2 are of array structure of independent light receiving elements 1a and 2a having their circumferences divided into a plurality of sections, and more particularly are of double circular ring structure. Reference numeral 3 denotes a rotary member which is a rotatable member disposed so as to be parallel to the surfaces of the light receiving elements 1a and 2a, reference numerals 4 and 5 designates light emitting elements such as LED's which are light emitting means, and reference numeral 6 denotes eccentricity correction means for effecting the combining or calculating process in conformity with the signals of the light receiving sensors 1 and 2. PL designates a reference line. Reference characters 4a and 5a denote the light incidence positions on the light receiving sensors 1 and 2, respectively.

In the present embodiment, the angle θ formed between a straight line L45 linking the two light incidence positions 4a and 5a on the light receiving means 1 and 2 together and an arbitrary reference line PL is obtained by calculating means to thereby obtain the rotation information of the rotatable member 3.

The light emitting elements 4 and 5 are designed to rotate with the rotation of the rotatable member 3 and condense light beams at the incidence positions 4a and 5a on the light receiving sensors 1 and 2, respectively, and form tracks following the double circumference. The lights emitted by the light emitting elements 4 and 5 are received by the light receiving sensors 1 and 2, respectively, whereby the rotated position of the rotary member 3 is detected. As described above, the lights emitted by the two light emitting elements 4 and 5 are received by the light receiving sensors 1 and 2 of double circular ring structure, whereby as compared with a case where the light of a single light emitting element is received by a single circular ring-shaped light receiving sensor, detection can be done with the influence of the eccentricity of the center of rotation of the rotary member 3 and the center of the light receiving sensors 1 and 2 being minimized.

In addition to this, the eccentricity correction means 6 effects the correction of the eccentricity of the center of rotation of this rotary member 3 and the center of the light receiving sensors 1 and 2.

Figure 3:
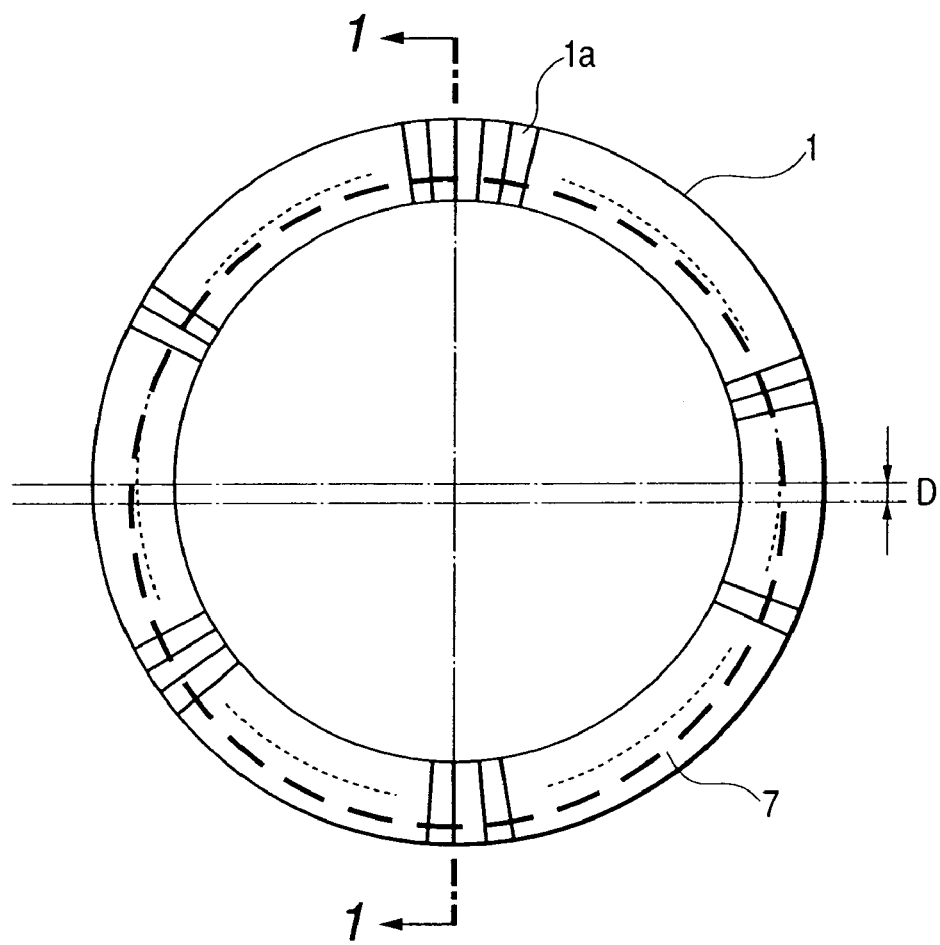
FIG. 3 is an illustration showing the deviation of an optical axis in light receiving means.
Figure 4:
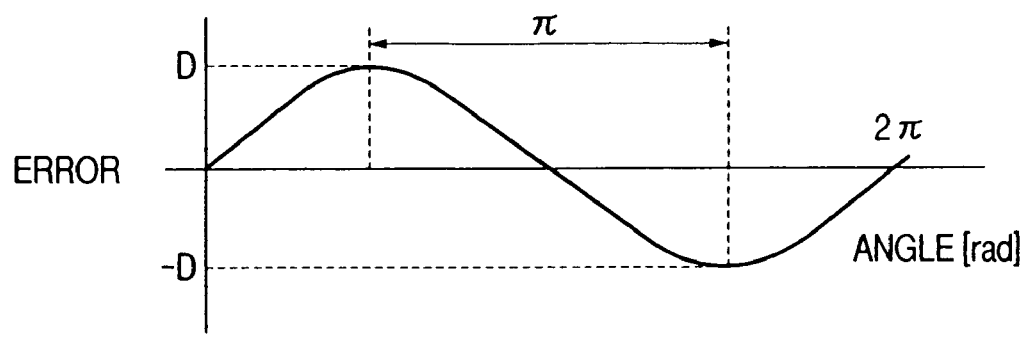
FIG. 4 is a characteristic graph showing the relations among the light receiving means and the amount of eccentricity of the optical axis and the rotated position.

FIG. 3 shows the locus of an eccentric light, and reference numeral 7 indicates a locus having an amount of eccentricity D. FIG. 4 shows a position detection error by the amount of eccentricity D, and when the rotation angle of the rotary member 3 rotates from 0 to 2π, a position error of ±D occurs. The position error D is maximum (+D) and minimum (−D) with the angle π therebetween, and the rotation angle is of a substantially point-symmetrical waveform centering around the position of π.

The eccentricity correction means 6 is designed to effect the correction of the amount of eccentricity by the use of this error characteristic. That is, the light emitting elements 4 and 5 are provided at positions opposed to each other with the center of rotation B–B' therebetween so that the detected angle may be shifted by π, and design is made such that a position error detected by the light receiving sensor 1 and a position error detected by the light receiving sensor 2 are of substantially the same magnitude and opposite in sign to each other and the position errors negate each other by simple addition.

The above-described position errors are not angles and therefore, more or less conversion thereof must be done when eccentricity correction calculation is actually done. Assuming that the numbers of divisions of the light receiving sensor 1 and the light receiving sensor 2 are the same, the diameters thereof differ from each other and, therefore, changes in the position errors on the respective circumference, when converted into angles, assume different values. When the diameters of the light receiving sensors 1 and 2 are defined as R1 and R2, respectively, the ratio between angle errors corresponding to the position errors becomes about D/R1:D/R2, and it will be seen that the smaller the diameters of the light receiving sensors 1 and 2, the greater the angle errors. Accordingly, if simple addition is done as described above, the angle errors cannot be negated.

So, for example, the angle error D/R2 of the light receiving sensor 2 is multiplied by R2/R1 to thereby correct and uniformize the angle error amount, and this value can be added. Also, adding the detected angles of the light receiving sensors 1 and 2 means that the number of pulses generated for one full rotation increases, and since the output of the light receiving sensor 2 has been multiplied by R2/R1, the number of pulses for one full rotation assumes a value (R1+R2)/R1 times as great as the number of pulses per light receiving sensor.

Here, the numbers of pulses of the light receiving sensors 1 and 2 are the same, but if the number of pulses of the light receiving sensor 2 is made in advance (R2/R1) times as great, the eccentricity correction calculation will suffice simply by adding. If for example, the diameter R1 of the light receiving sensor 1 is 4 mm and the diameter R2 of the light receiving sensor 2 is 2 mm and the number of pulses of the light receiving sensor 1 is 1024 pulses and the number of pulses of the light receiving sensor 2 is 512 pulses, 1536 pulses will be obtained per one full rotation.

Also, the numbers of pulses of the light receiving sensor 1 and the light receiving sensor 2 are added, whereafter the result of the addition may be divided by 2 and the average value may be outputted. In the above-described numerical value example, (1024+512)/2=768 (pulses). Thereby, the angle detection value does' not advance by two pulses at a time.

Also, while in the present embodiment, the light receiving sensors 1 and 2 are formed into a circular ring shape, a similar effect can be expected even if use is made of a part of a circular ring or the beams from the light emitting elements 4 and 5 are made obliquely incident and the light receiving sensors 1 and 2 are formed into an elliptical shape. Also, while here, angle information corresponding to the incidence positions of two beams detected by the light receiving sensors 1 and 2 is obtained, and this is corrected by the use of the diameters of the light receiving sensors 1 and 2 and thereafter is added to thereby obtain the beam rotation angle. Also, the incidence positions of the beams detected by the light receiving sensors 1 and 2 may be represented by polar coordinates by the use of the diameters of the light receiving sensors 1 and 2 and the angle information corresponding to the incidence positions of the beams, and the beam incidence positions represented by the two polar coordinates may be linked together by a straight line. The angle formed between this straight line and reference line PL may be obtained by calculation.

A second embodiment will now be described with reference to FIG. 5.

Figure 5:
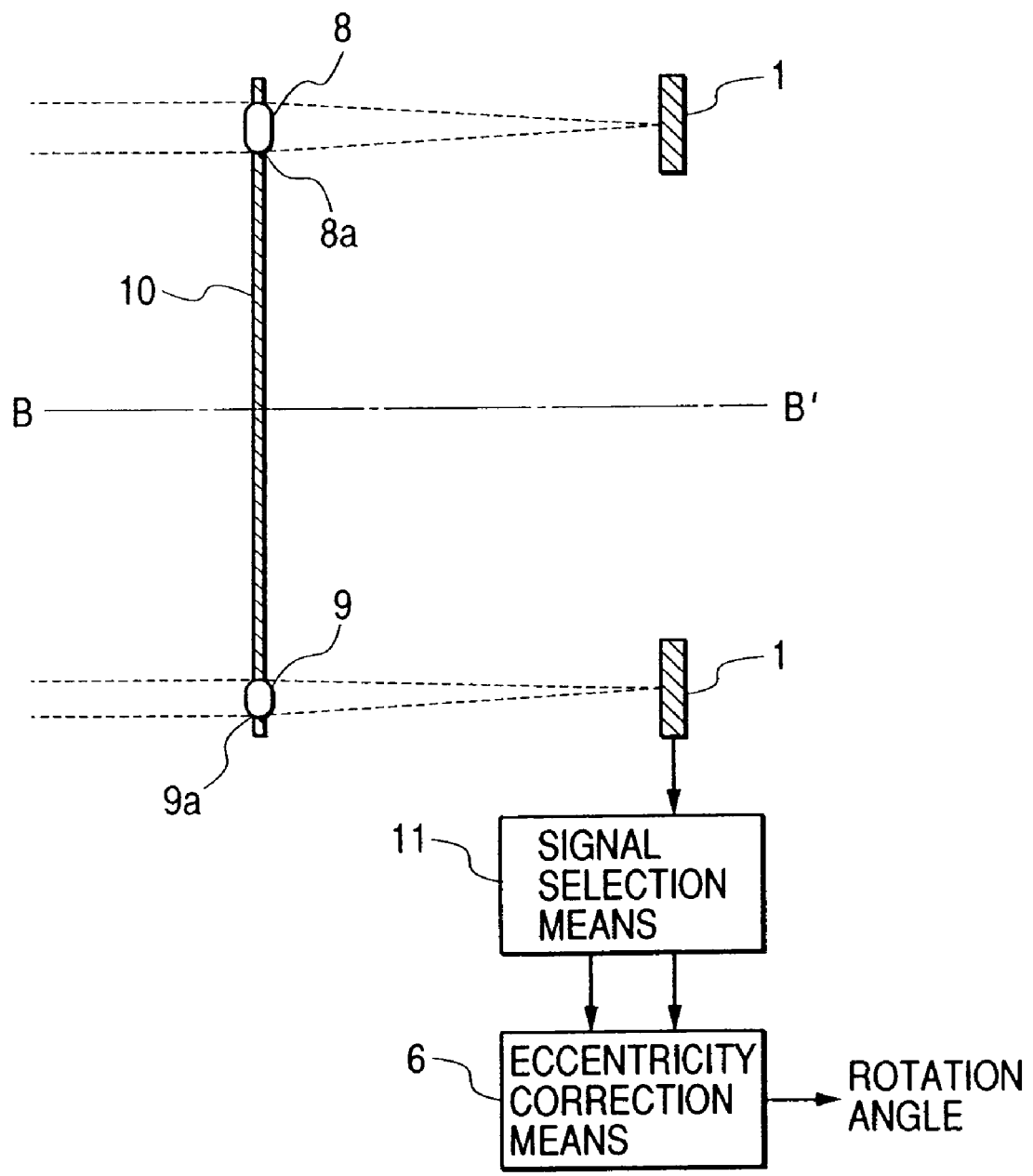
FIG. 5 shows the cross-sectional construction of a rotation detecting apparatus according to a second embodiment of the present invention.

In FIG. 5, reference numerals 8 and 9 designate lenses which are condensing means, reference numeral 10 denotes a rotary member rotating about the center line B–B', and reference numeral 1 designates a light receiving sensor. Light transmitting windows 8a and 9a are provided at positions symmetrical about the center line B–B' of the rotary member 10, and the lenses 8 and 9 differing in effective diameter from each other are mounted in these light transmitting windows. The lenses 8 and 9 are disposed so as to condense a light uniformly applied from a light source, not shown, onto the rotary member 10, for example, natural light on the light receiving sensor 1, and the power of the light condensed on the light receiving sensor 1 by the lens 8 is made great to such a degree that it can be discriminated by the power of the light by the lens 9. That is, in the present embodiment, the information (such as intensity, color and polarization) of light is changed and made discriminable.

Reference numeral 11 denotes signal selection means which selects the angle signal by the difference in the intensity (power) of the light detected by the light receiving sensor 1, and detects the rotation angle of the rotary member 10 from two bits of angle information. Thereby, the influence of eccentricity can be minimized and detected. In addition to this, design is made such that the output of the signal selection means 11 is eccentricity-corrected by the eccentricity correction means 6.

The present embodiment can correct eccentricity only by simple addition because of a single light receiving sensor 1. When for example, the diameter of the light receiving sensor 1 is 3 mm and the number of pulses is 1024 pulses, the number of pulses becomes 2048 pulses after the eccentricity correction calculation, and when it is divided by 2, the number of pulses becomes 1024 pulses. Also, while here, the number of divisions of the light receiving sensor 1 is made the same as the number of pulses, this method is of course effective even if the adjacent pulses are divided into more than the actual number of divisions of the light receiving sensor 1 by a resistance dividing method or the like to thereby increase the number of pulses.

Also, while in this second embodiment, the applied positions of two beams are independently detected by the difference in the power of light, there may be adopted a construction in which polarizing filters are provided in the individual divisional areas of the light receiving sensor 1 so that detection intensities may differ by the difference in polarization angle, and polarizing filters are also provided on the surfaces of the lenses 8 and 9 with their respective angles changed.

If for example, in the light receiving sensor 1, the polarizing direction is set radially relative to the center of the sensor and in the lens 8, the polarizing direction is set radially relative to the center of rotation and in the lens 9, the polarizing direction is set so as to form a predetermined polarizing direction relative to the polarizing direction of the lens 8, lights of different polarization angles can be converted into different light power by the polarizing filters provided on the light receiving sensor 1 and therefore, the lights can be independently detected by the above-described method.

Also, while in this second embodiment, lights of different powers are condensed on the light receiving sensor 1 by the use of the lenses 8 and 9, a similar effect can be obtained even if light emitting means of different powers are used instead of the lenses 8 and 9. Also, a light receiving sensor 1 may have different sensitivity depending on the wavelength of light, and if such sensor is used, two beam positions can be detected by changing the wavelengths of two light sources.

Figure 6:
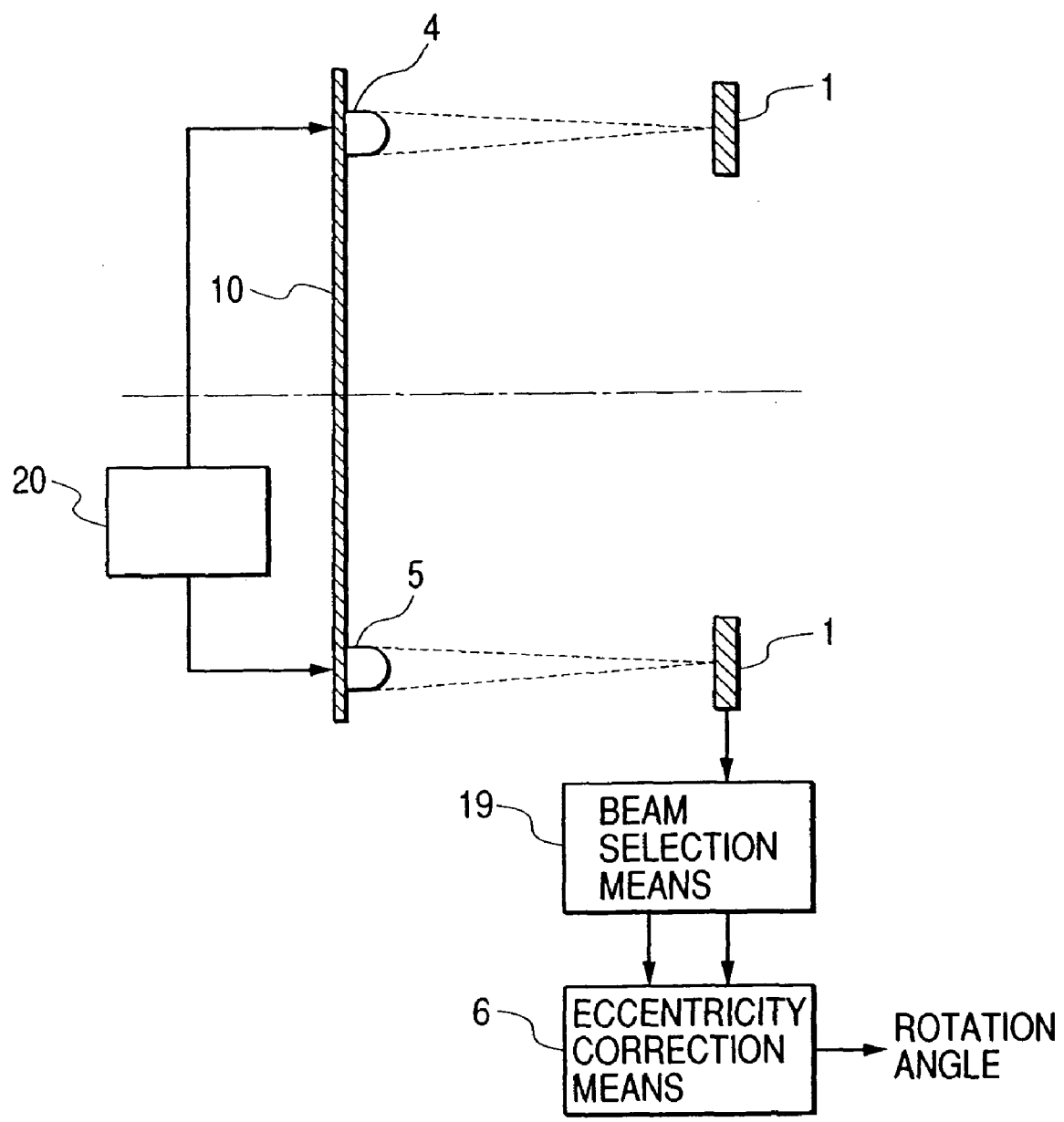
FIG. 6 shows the cross-sectional construction of a rotation detecting apparatus according to a modification of the second embodiment.

Also, as shown in FIG. 6, the light emitting elements 4 and 5 which are two light sources are alternately turned on and off, whereby there can be provided a construction which independently detects the respective positions. In FIG. 6, reference numeral 19 designates beam selection means, and reference numeral 20 denotes light source switching means. The detection angle of the light receiving sensor 1 is independently detected correspondingly to the timing of the light source switching means 20, whereby two beam positions are detected.

As described above, the signal is selected by the beam selection means 19 with the aid of the differences in the characteristics of lights such as the wavelengths, powers, deflection angles and light emission timing of at least two beams, whereby the influence of eccentricity can be minimized and the rotation angles of the beams can be independently detected.

A third embodiment will now be described with reference to FIGS. 7 and 8.

Figure 7:
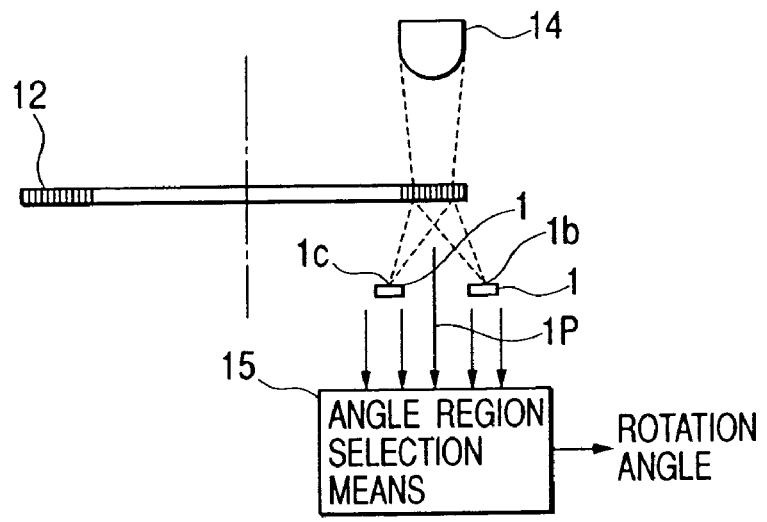
FIG. 7 shows the cross-sectional construction of a rotation detecting apparatus according to a third embodiment of the present invention.
Figure 8:
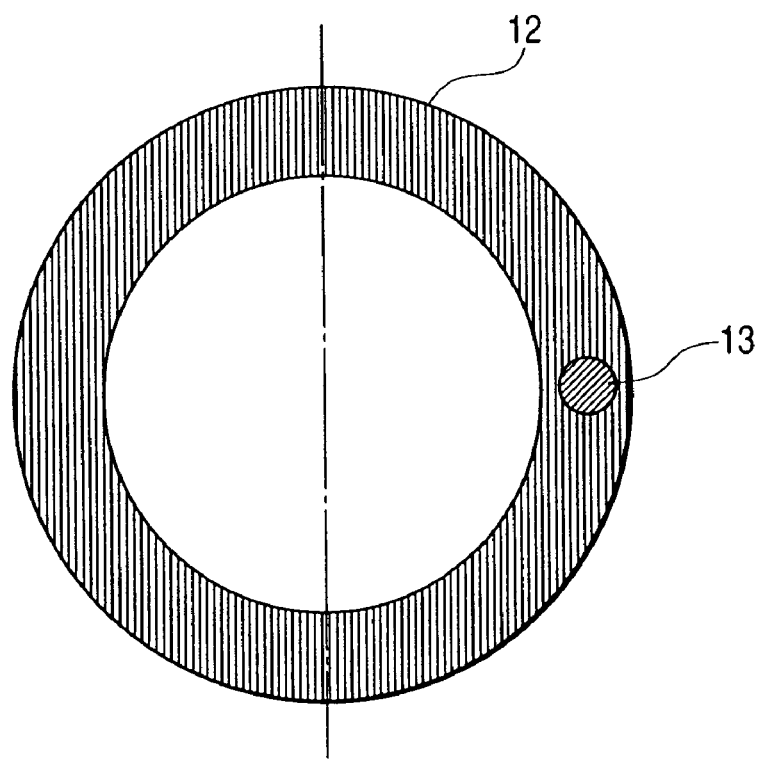
FIG. 8 is a plan view of the rotary member of FIG. 7.

In FIG. 7, reference numeral 12 designates a circular ring-shaped rotary member, and a diffraction grating (light deflecting means) portion having a diffraction grating is provided in one direction on the surface thereof. Reference numeral 14 denotes a light emitting element which is light emitting means, and reference numeral 15 designates angle region selection means. A circle 13 shown in FIG. 8 which is a plan view of the rotary member 12 indicates a portion through which the output light of the light emitting element 14 passes. The light emitting element 14 is means emitting light of high coherency, and when the light is transmitted through the rotary member 12, the diffracting direction rotates in conformity with the diffracting direction and rotation angle of the diffraction grating on the rotary member 12 and therefore, by the rotation angle of that light being detected by the light receiving sensor 1, the rotation angle of the rotary member 12 can be detected. The light receiving sensor 1 has a circular ring-shaped detection region. 1P denotes the center of the light receiving sensor 1.

Since diffracted lights are created at symmetrical positions, lights of the same power are incident on the two positions 1b and 1c on the light receiving sensor 1. Accordingly, the lights cannot be separated by the signal selection means 11 used in the second embodiment and therefore, the light receiving sensor 1 is divided into three or more groups, and depending on to which group the beam belongs, a signal is selected by the angle region selection means 15 and the positions of the two beams are detected.

A fourth embodiment will now be described with reference to FIG. 9.

Figure 9:
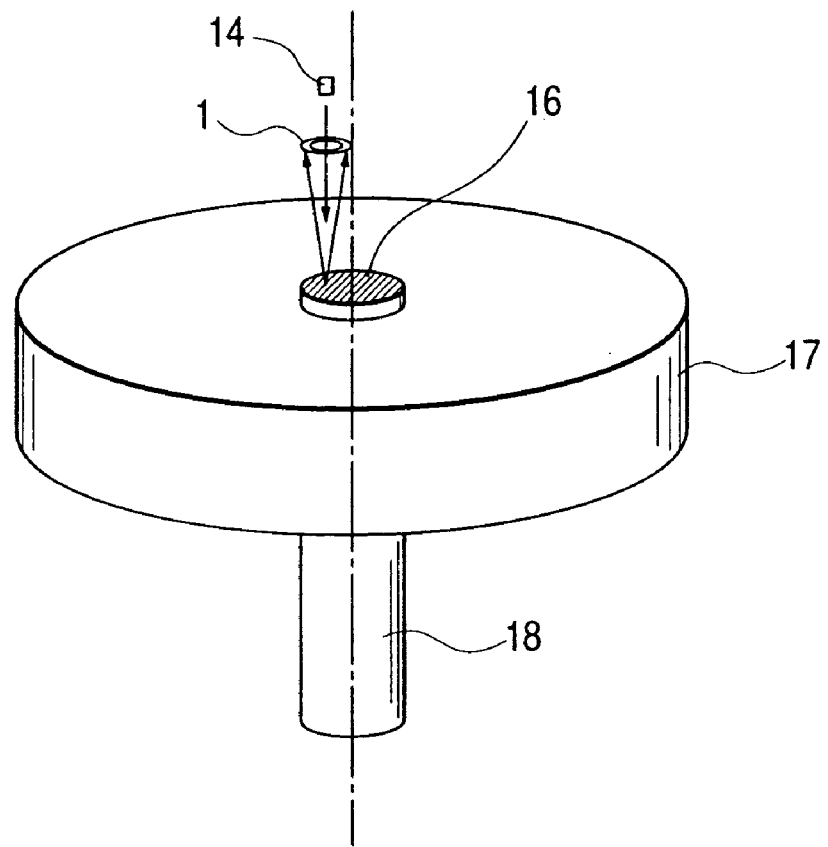
FIG. 9 is a schematic perspective view of a rotation detecting apparatus according to a fourth embodiment of the present invention.

In FIG. 9, reference numeral 17 designates a motor, and reference numeral 18 denotes the shaft of the motor 17, and a reflecting portion (reflecting member) 16 which is light deflecting means is formed on one end surface of the shaft 18. The reflecting portion 16 has a sawtooth-like cross-sectional shape and has a plurality of fine inclined surfaces parallel to one another.

Figure 10:
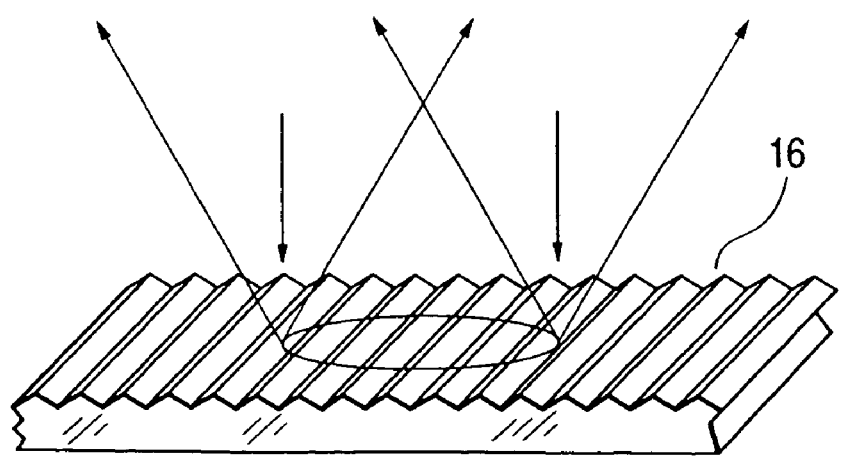
FIG. 10 is a perspective view showing the construction of a reflecting portion.
Figure 11A:
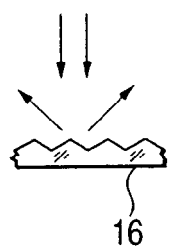
FIGS. 11A, 11B and 11C are side views showing examples of the reflecting portion.
Figure 11B:
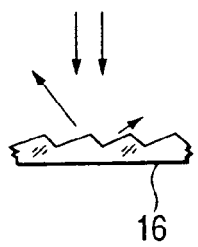
Figure 11C:
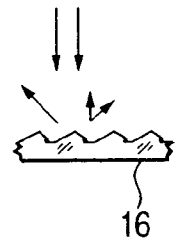

As shown in FIG. 10, each of the convex portions of the reflecting portion 16 is of a bilaterally symmetrical mountain shape, and in this case, the incident light is reflected at the same reflection angle by the respective surfaces of the mountain shape and divided into two directions, and those lights have the same quantity of light. The shape of the sides of this reflecting portion 16 of the bilaterally symmetrical mountain shape is shown in FIG. 11A. Also, FIG. 11B shows the shape of the reflecting portion 16 when the reflection angles and quantities of light of the incident light in two directions differ, and FIG. 11C shows the shape of the reflecting portion 16 when the reflection angles of the beam in two directions are the same and the quantities of light in two directions differ and one reflected light is in the same direction as the direction of the incident light. If the reflecting portion 16 of FIG. 11C is used, the separation of the lights by the quantity of light in the second embodiment is possible, and if the reflecting portion 16 of FIG. 11B is used and the double circular ring-shaped light receiving sensor 1 in the first embodiment is used, the separation of the beams is possible. In the case of FIG. 11A, if as in the third embodiment, the beams are separated in the angle region or the detection angle region is only a half round, the separation of the beams becomes possible.

Thus, as shown in FIG. 9, the light applied by the light emitting element 14 is reflected in a direction conforming to the rotation of the rotary shaft 18 by the reflecting portion 16 directly worked on the end surface of the rotary shaft 18, and two beams are applied to the light receiving sensor 1. Thus, the rotation angle can be detected by the method described in the first, second and third embodiments.

While in this fourth embodiment, the reflecting portion 16 is directly worked on the end surface of the rotary shaft 18, there may be adopted a construction in which a reflecting portion 16 formed of resin or a metal is stuck on the end surface of the rotary shaft 18.

Figure 12:
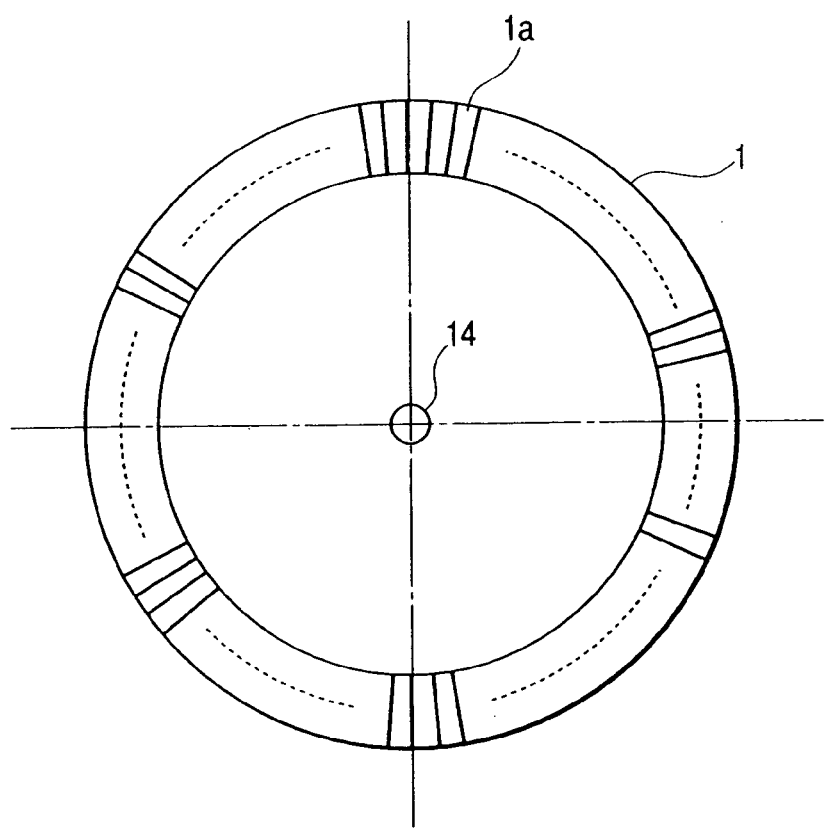
FIG. 12 is a plan view showing an example in which light receiving means and light emitting means are disposed on the same plane.

FIG. 12 shows an example in which the circular ring-shaped light receiving sensor 1 and the light emitting element 14 are constructed on the same plane. In this case, the light from the light emitting element 14 is reflected by the reflecting portion, not shown, and is received by the light receiving sensor 1.

If this light receiving sensor 1 and the light emitting element 14 are made by the same semiconductor process such as GaAS, the positional relationship between the light emitting element 14 and the light receiving sensor 1 can be made highly accurately. If for example, the characteristic of LED as the light receiving sensor 1 is utilized, it is possible to make the light emitting element 14 and the light receiving sensor 1 by the same process.

Also, if GaAS is used, there is the merit that the peripheral circuit also becomes high in speed. There may also be adopted a construction in which a peripheral circuit using a photodiode or the like is constructed in the circular ring of the light receiving sensor 1 and an LED chip which is the light emitting element 14 is disposed at the center of the light receiving sensor 1 to thereby control the quantity of emitted light.

Also, while in the present embodiment, two beams are obtained by the use of the principle of a simple reflecting surface of a metal or the like, total reflection may be utilized by the use of transparent resin or the like.

Figure 13:
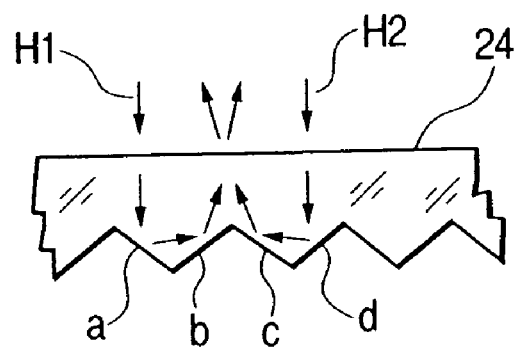
FIG. 13 is a cross-sectional view showing an optical member utilizing total reflection.

FIG. 13 shows an example using an optical member 24 having total reflection surfaces. A beam H1 is reflected and returned by total reflection surfaces a and b, and a beam H2 is reflected and returned by total reflection surfaces d and c. The total reflection surfaces a and b and the total reflection surfaces c and d form an angle greater than 90° therebetween, and when a parallel beam is incident thereon, it is reflected with some angle.

Figure 14:
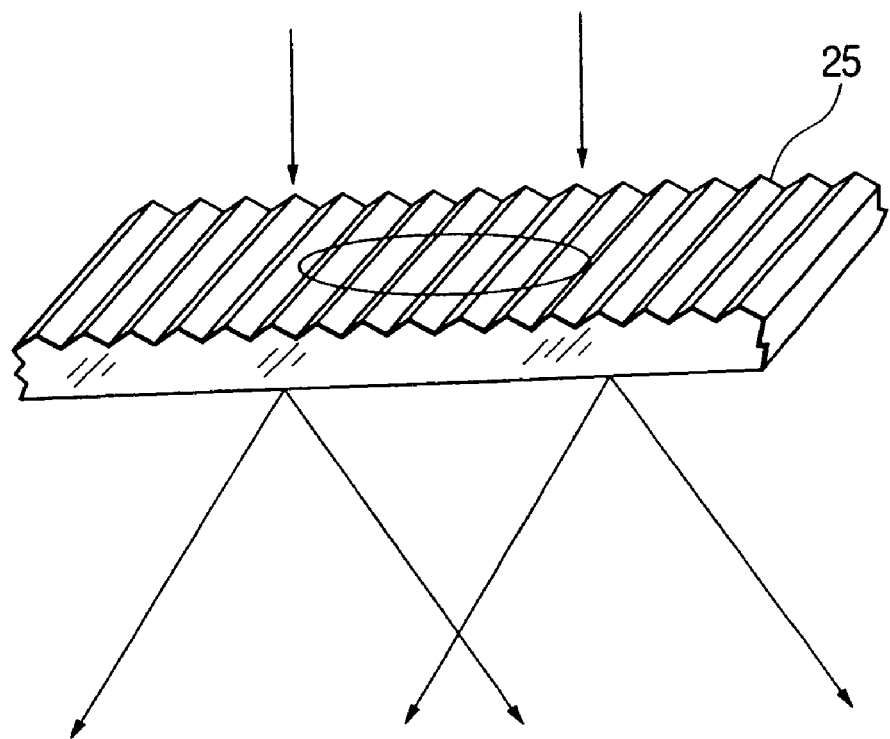
FIG. 14 is a perspective view showing a refracting portion.

While the method by reflection has been described above as the light deflecting means for making two beams, a similar effect can also be obtained by refraction (a refracting member), and the construction thereof is shown in FIGS. 14 and 15.

In this embodiment, two beams are obtained by using an optical member 25 having a plurality of refracting surfaces made of resin or glass. In FIG. 14, a beam enters the optical member 25 having bilaterally symmetrical mountain-shaped refracting portions, and beams divided into two directions are obtained from the emergence side surface (back).

Figure 15A:
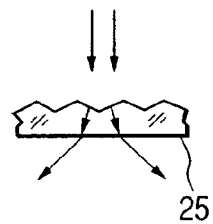
FIGS. 15A, 15B and 15C are side views showing examples of the refracting portion.
Figure 15B:
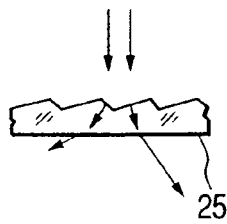
Figure 15C:
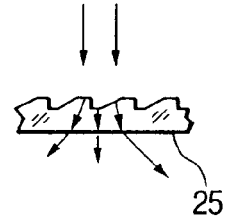

The divided beams can be changed by the shape of the mountain-shaped refracting surfaces of this optical member 25. FIG. 15A shows the example of FIG. 14, in which the refractive angles of the incident beams are the same at right and left and the beams have the same power. In FIG. 15B, the refractive angles differ at right and left and the power also differs. In FIG. 15C, the beam is divided into three, and the refractive angles of the incident beams are the same at right and left and the beams differ in power. If such beams are used, it becomes possible to find the rotation angle as in the description of the reflecting surfaces.

Figure 16:
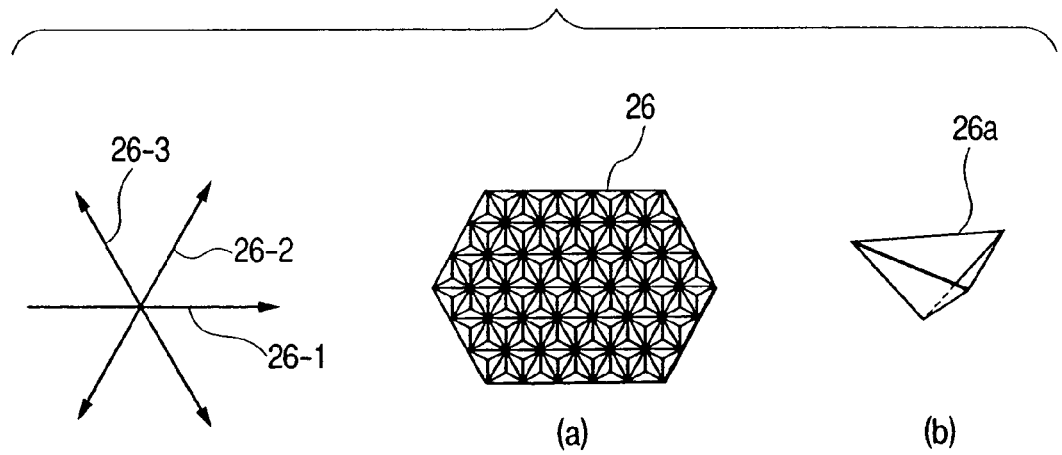
FIG. 16 is a plan view (a) showing a reflecting surface comprising a plurality of triangular pyramid-shaped recesses and a perspective view (b) showing a triangular pyramid-shaped recess.

FIG. 16 shows an embodiment of the light deflecting means in which as reflecting surfaces, a plurality of triangular pyramidal concave surfaces are continuously disposed in parallel to a rotational plane. FIG. 16($a$) is a plan view of the reflecting surface 26 as it is seen from above it, and FIG. 16($b$) is a perspective view showing a triangular pyramidal concave surface 26$a$, and the cross-sectional shape thereof is triangular. Even if such a complicated reflecting surface 26 and a plurality of beams are used, the beams also rotate if the reflecting surface 26 rotates and therefore, detection is possible in a similar manner. Here, recesses 26$a$ are provided adjacent to one another in three directions (26-1, 26-2, 26-3).

In this case, the incident beam onto the reflecting surface 26 is divided into three or six directions, and these positions can all be independently detected and eccentricity-corrected. Also, the reflecting surface 26 of such a shape exhibits the good characteristic that the inclination of the beam can be coped with because even if the direction of the incident light is inclined, as regards the inclination of reflected light, a desired angle of reflection is obtained for the incident light.

Although in this embodiment, the intervals among the minute recesses or convex portions constituting the reflecting surface 26 have not been particularly touched upon, the intervals may be equal or not so. If the intervals are equal, the reflecting surface will be influenced by diffraction, but the influence will be small if the intervals are sufficiently greater than the wavelength of the light.

If the diameter of the beam in the portion of the reflecting surface 26 on which the beam impinges is large relative to the intervals among the recesses or convex portions, it is desirable because the influence of the working accuracy of the end portions, dust, injuries, etc. is alleviated in that case. It is desirable that the diameter of the beam applied to the light receiving sensor 1 be equal to or less than the circumferential interval between independent adjacent light receiving sensors 1, but even if it is larger than that, the center of the beam can be detected if calculation or the like is done between the adjacent light receiving sensors 1.

While in this embodiment, the triangular pyramidal concave surfaces 26$a$ are the reflecting surface, a similar effect can be obtained by the reflecting surface being provided by a refracting surface.

Figure 17:
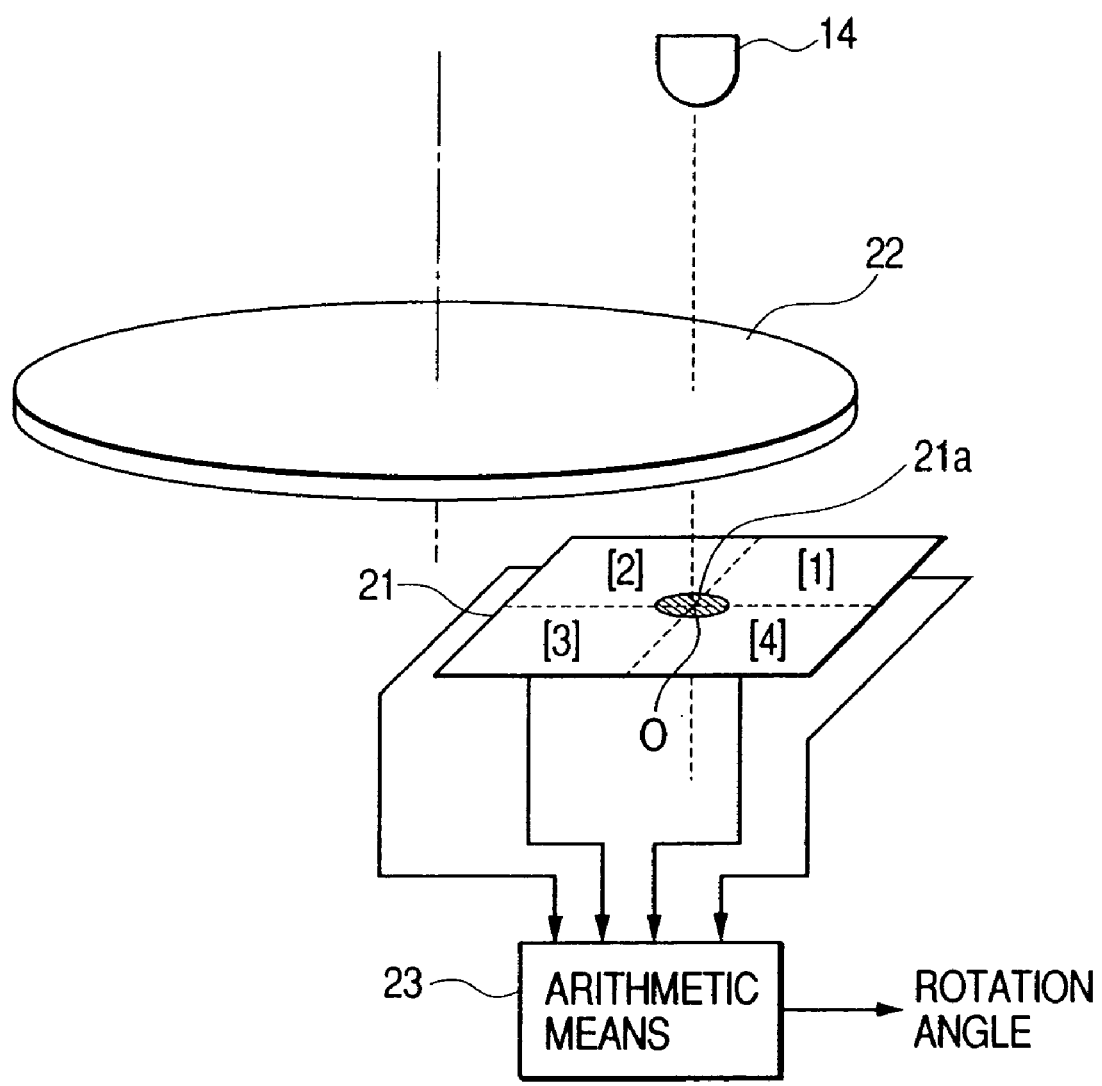
FIG. 17 schematically shows the construction of a rotation detecting apparatus according to a fifth embodiment of the present invention.

A fifth embodiment will now be described with reference to FIG. 17.

This fifth embodiment is one in which the rotary member is provided with a diffraction grating portion. In FIG. 17, reference numeral 21 designates a conventional PSD (position sensing device) divided into four, and it breaks into four quadrants [1], [2], [3] and [4] with the center thereof as the origin 0. The respective quadrants are designed to independently detect the incidence positions of the beam, and are adapted to independently detect X coordinates and Y coordinates in respective regions. Reference numeral 22 designates a rotary member provided with a diffraction grating portion, and a beam from a light source 14 is diffracted in a plurality of directions at an angle conforming to the wavelength of the beam.

The 0-order light travels rectilinearly, and ±1st-order lights are deflected into a direction forming a predetermined angle with respect to the 0-order light at a predetermined angle in conformity with the direction of the diffraction grating. Further, high order lights may also be used, but here the position of the light is detected by the use of the ±1st-order lights. Here, the 0-order light is a hindrance to the detection of the ±1st-order lights and therefore, a mask area 21a (hatched portion) for blocking the 0-order light is formed near the origin of the PSD 21.

Reference numeral 23 denotes arithmetic means for calculating the angle between two points from the position information of two lights from the PSD 21 and outputting it, and it detects the rotation angle of the light without being affected by the deviation between the origin of the PSD 21 and the center of rotation of the ±1st-order lights from the rotary member 22.

In this construction, the PSD 21 detects also the presence or absence of the incidence of the beams at the same time, and detects the positions of two beams by the use of the information of the portions on which the two beams incident from the rotary member 22 while rotating are incident. Also, when the beams stride over the boundary between the quadrants, it effects correction by the use of the quantity of light incident on two quadrants.

There are several other methods for cutting the 0-order light, and for example, use can be made of a method of forming a phase grating as the diffraction grating, or constructing an intercepting object on the optical path of the 0-order light instead of providing the mask area 21a on the PSD 21, or forming an aperture in the origin portion of the PSD 21.

Figure 18:
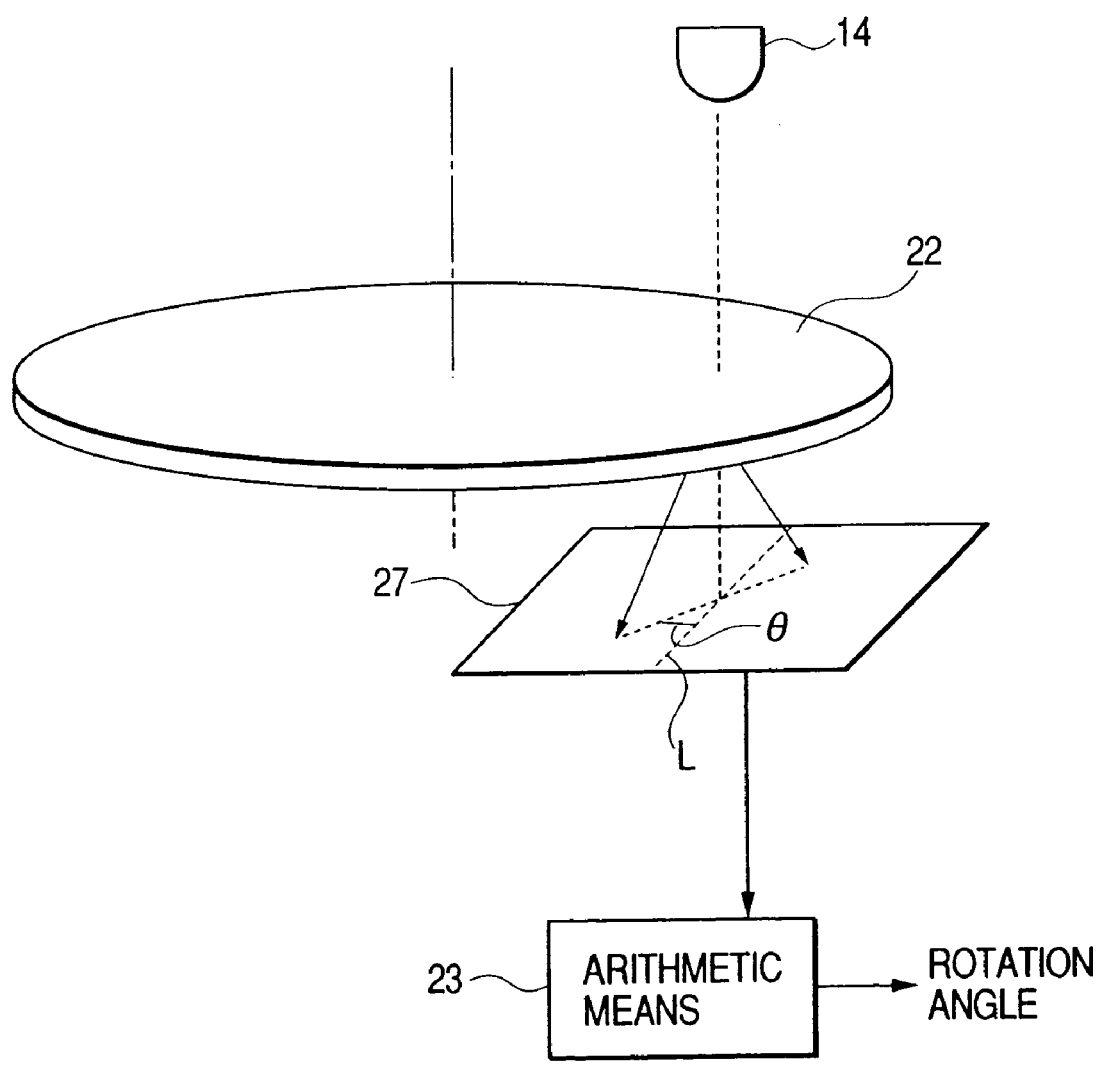
FIG. 18 schematically shows the construction of a rotation detecting apparatus according to a sixth embodiment of the present invention.

A sixth embodiment of the present invention will now be described with reference to FIG. 18.

This sixth embodiment is one using a two-dimensional image sensor as the light receiving sensor. In FIG. 18, reference numeral 14 designates a light source, reference numeral 22 denotes a rotary member provided with a diffraction grating portion, reference numeral 27 designates an image sensor, and reference numeral 23 denotes arithmetic means. A beam from the light source 14 is divided into two beams by the rotary member 22, and the two beams enter the image sensor 27. Image information inputted to the image sensor 27 is sent to the arithmetic means 23. In the arithmetic means 23, the power centers of the two beams are obtained from the inputted image, and the angle θ formed between a straight line linking these two beams together and an imaginarily provided reference line L is calculated, and the rotation angle is outputted.

Of course, use may be made of any of a method of using a DSP or the like as the arithmetic means 23 to calculate in a software-like fashion and a method of using a digital circuit as the arithmetic means 23 to calculate in a hardware-like fashion.

Figure 19:
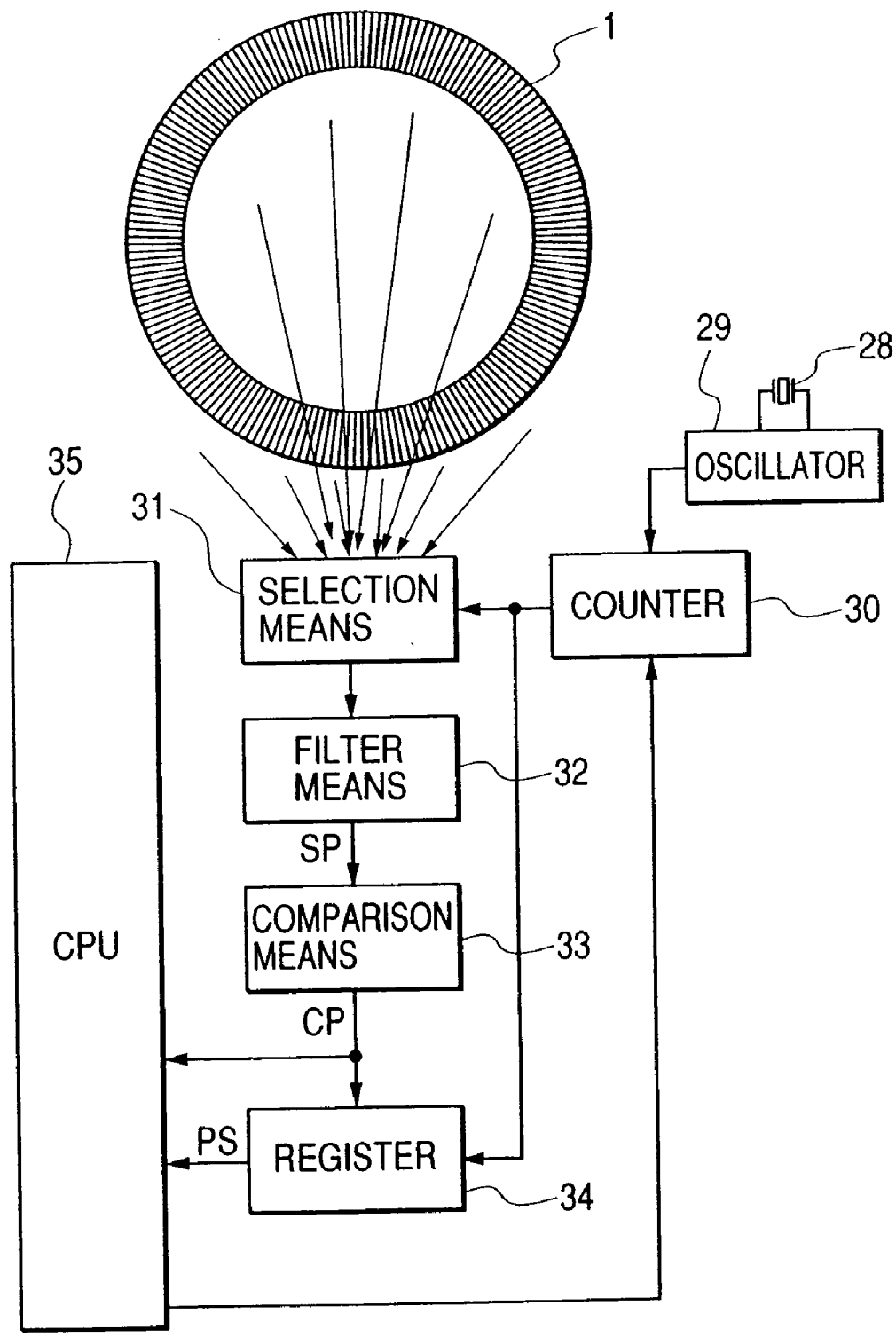
FIG. 19 is a block diagram of a rotation detecting apparatus according to a seventh embodiment of the present invention.

FIG. 19 is a block diagram showing a seventh embodiment. In FIG. 19, reference numeral 28 designates a crystal resonator, and reference numeral 29 denotes an oscillator using the crystal resonator 28. The crystal resonator 28 and the oscillator 29 together constitute pulse generating means. Reference numeral 30 designates a counter (constituting address producing means) for counting the output signal of the oscillator 29, and the count value thereof is reset by a signal from a CPU 35 which will be described later, and the counter 30 has the function of the address producing means. Reference numeral 31 denotes selection means for selecting from the outputs of the plurality of light receiving elements of the light receiving sensor 1 on the basis of the output value of the counter 30. Reference numeral 32 designates filter means for removing the noise of the output signal of the selection means 31, reference numeral 33 denotes comparison means for comparing the output signal of the filter means 32 with a predetermined value, reference numeral 34 designates a register for reading the output signal of the counter 30 by the pulse edge of the output signal of the comparison means 33, and reference numeral 35 denotes a CPU for inputting the output of the register 34 thereto and calculating on which position of the light receiving sensor 1 the beam has been incident.

The operation of the present embodiment will now be described. The counter 30 starts counting from 0 when it counts a pulse signal of e.g. 10 MHz from the oscillator 29 and receives a reset signal from the CPU 35. The selection means 31 clockwisely selects in order from a light receiving element corresponding to No. 0 of the light receiving sensor 1, and converts a current signal corresponding to the beam input from each light receiving element into a voltage and outputs it.

If here, the number of light receiving elements is e.g. 1024, all light receiving elements can be selected if the counter 30 is a counter of 10 bits. The output of the selection means 31 has its noise component of a high frequency removed by the filter means 32, and is compared with a predetermined value by the comparison means 33. If the output SP of the filter means 32 is greater than this predetermined value, it is judged that the quantity of light inputted to the light receiving elements is great and a high level signal is outputted, and if conversely the output of the filter means 32 is small, it is judged that the quantity of light inputted to the light receiving elements is small and a low level signal is outputted. The register 34 memorizes therein a count value PS outputted by the counter 30 and outputs it to the CPU 35 when it detects the changing edge of the output signal CP of the comparison means 33.

Figure 25:
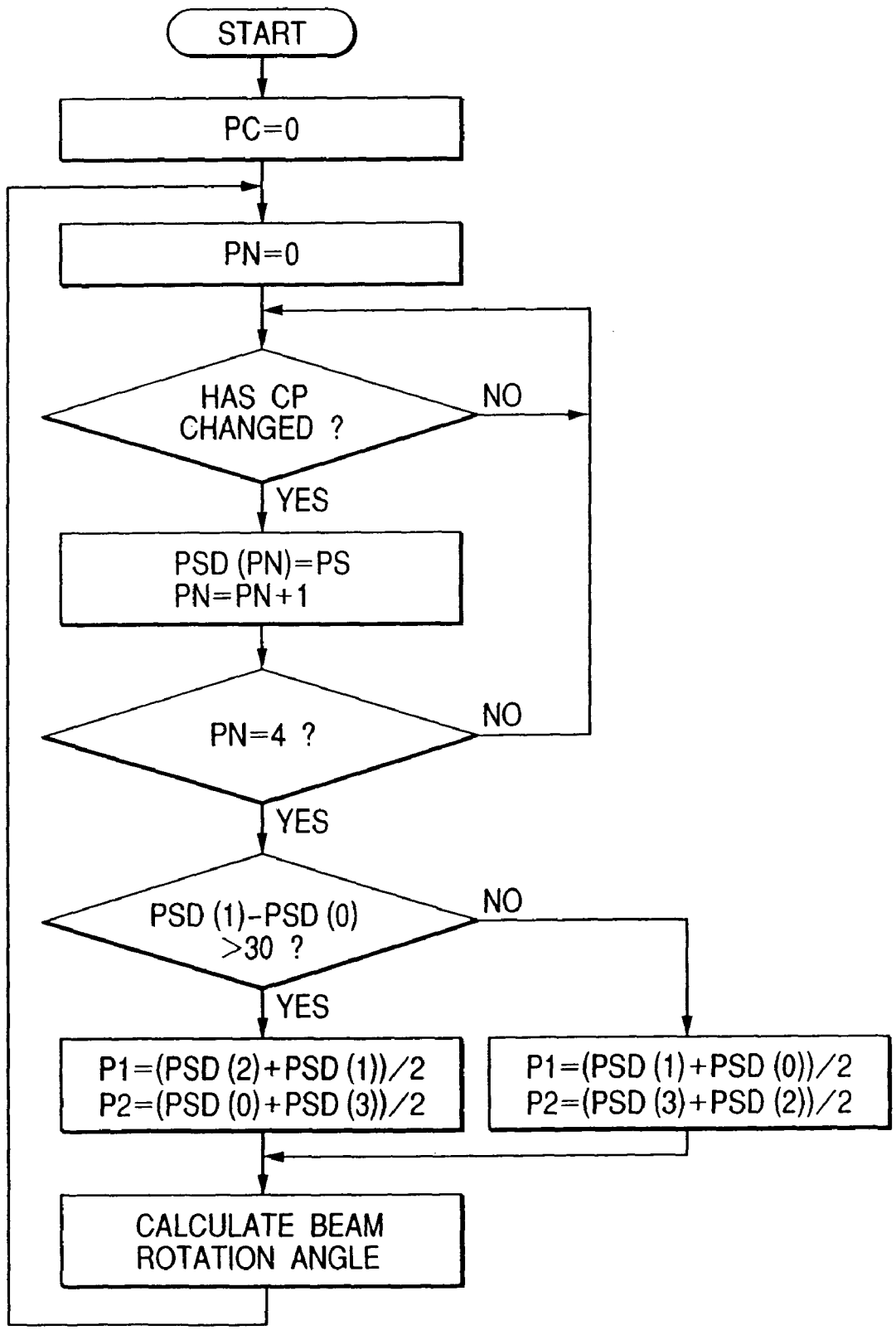
FIG. 25 is a flow chart 1 illustrating the operation of the seventh embodiment.
Figure 26:
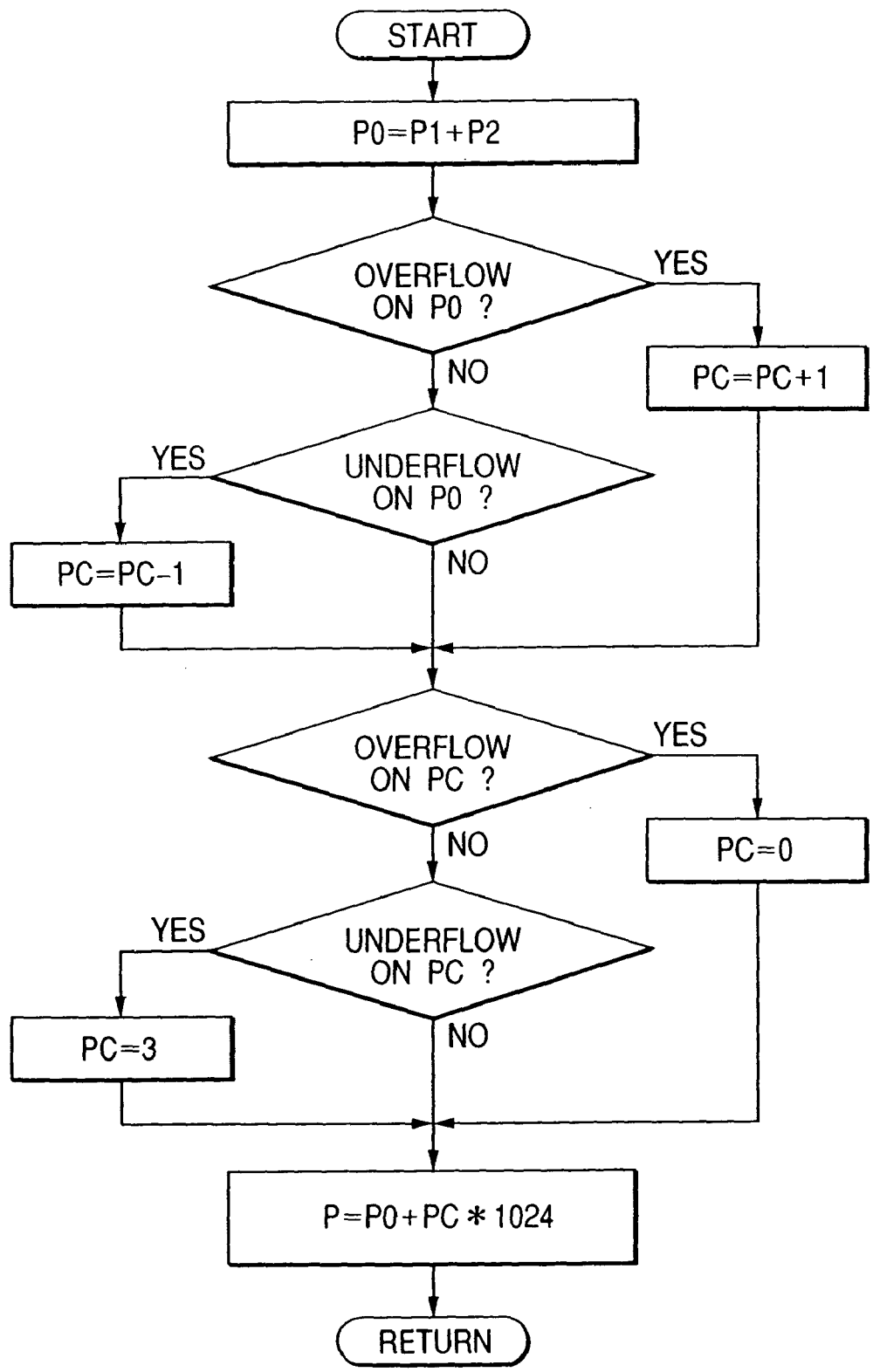
FIG. 26 is a flow chart 2 illustrating the operation of the seventh embodiment.
Figure 27:
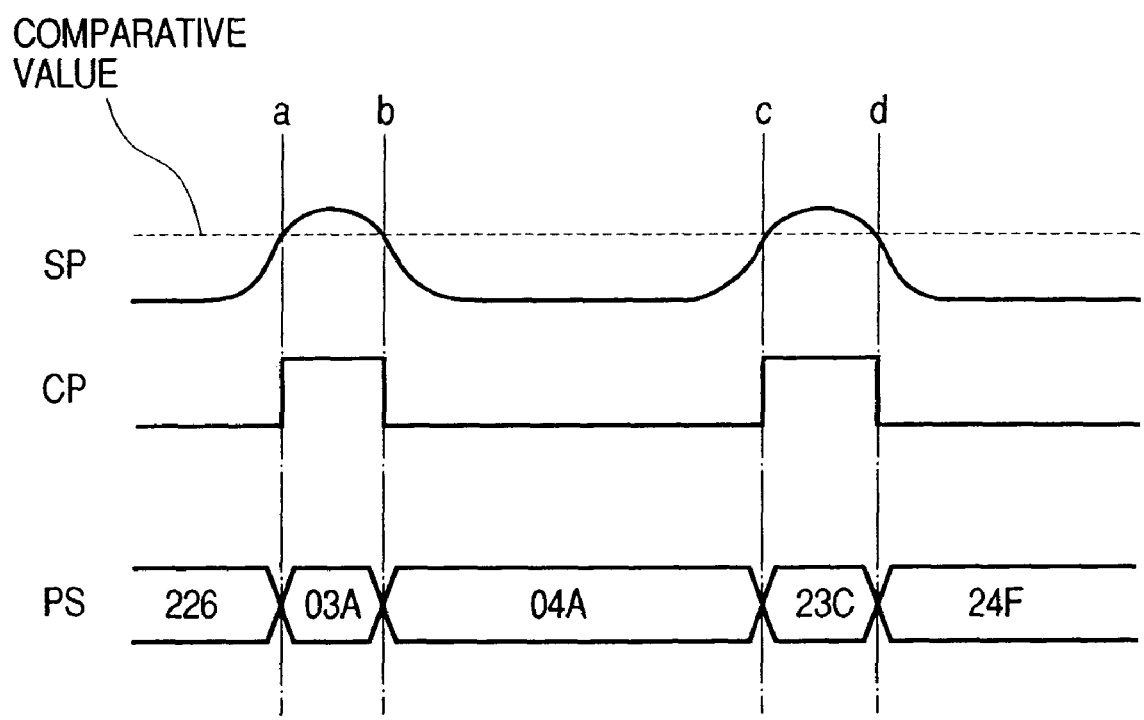
FIG. 27 is a timing chart 1 showing the signal waveform of each portion of the seventh embodiment.

The CPU 35 deduces the beam incidence position (i.e., angle information corresponding thereto) from the output PS of the register 34. The method of deducing the beam incidence position (angle information) will hereinafter be described in a little greater detail. The following is the description when the number of beams incident on the light receiving sensor 1 is two and design is made such that the two beams are incident on substantially opposed positions on the circumference. FIGS. 25 and 26 are flow charts illustrating the calculating operation. FIG. 27 shows the signal of each portion of the block diagram of FIG. 19. The signals of FIG. 27 will first be described. SP is the output of the filter means 32, and more particularly is a signal having had its noise of a high frequency component removed by the filter means 32 relative to a signal in which the outputs of the respective light receiving elements of the light receiving sensor 1 have been clockwisely outputted in order.

The incident beams are two and are incident on the substantially opposed positions on the circumference of the light receiving sensor 1 and therefore, as shown in FIG. 27, two mountain-shaped waveforms appear at timings corresponding to the beam incidence positions. CP is the result of the signal SP having been compared with a predetermined comparative value by the comparison means 33. Thereby, there is produced a pulse signal having pulse edges a, b, c and d. PS represents the result of the detection by the register 34 as to at which position that light receiving element of the light receiving sensor 1 which is scanning lies at the timing of the pulse edge of the signal CPU.

Since the spot diameter of the incident beam is sufficiently small relative to the diameter of the light receiving sensor 1, the pulse width of the signal CP is small, and the timing of the central position of this small pulse width of the pulse corresponds to the timing of the beam incidence position. A method of calculating the rotation angle of the beam will now be described with reference to the flow charts of FIGS. 25 and 26. Description will first be made on the assumption that the quantities of light of two beams are substantially the same.

Since the number of incident beams is two and these beams are incident on the substantially opposed positions on the circumference of the light receiving sensor 1, substantially the same states of the incident light occur twice while an incident beam makes one full rotation. Therefore, it is impossible to judge the first half round or the latter half round when the beam makes one round and thus, that state must be controlled. That is, in a beam rotation angle detecting portion, basically 0° to 180° must be detected, and the detection of rotation angles greater than that must be effected by the process of taking a carry. Also, if the supply of a power source is cut off, the controlled amount of state is erased and therefore, in order that it may not be erased, it is necessary to back up the content of memory by a flash ROM or a memory element or the like with a battery, and again input it when the power source is supplied. Further, when the detection of the multirotation of the beam is to be effected, information including how many rounds have been made must be controlled.

In the flow chart of FIG. 25, PC is a variable for controlling it, and the variable PC is 0 or 1 when the number of beams is two, and when multiple rotations are to be represented, a number the number of rotations times as great becomes necessary. The following describes a case where two full rotations is represented. In the case of two full rotations, the variable PC assumes four values, i.e., 0 to 3.

First, the variable PC is initialized to 0. A variable PN is a variable for controlling the number of the edges of the signal CP when the light receiving elements of the light receiving sensor 1 are scanned over a round. The variable PN is initialized to 0 each time the beam rotation angle is detected, and counts the number of the edges of the signal CP. When the signal CP changes, 1 is added to the variable PN and also, the light receiving element position (which corresponds to an angle) corresponding to the edge position at that time is inputted to an arrangement variable PSD (PN). This is repeated four times until the variable PN becomes 4. Thereupon, the light receiving element position of the light receiving sensor 1 which corresponds to the pulse edge of the signal CP is inputted to PSD (PN) in the order of PN= 0, 1, 2, 3. Next, whether the interval between PSD (0) and PSD (1) is wider or narrower than 30 is judged, and if it is narrower, it is judged that the center of the beams is between PSD (0) and PSD (1), and angle information P1 corresponding to the incidence position of the first beam (when a reference line passing through the center of the arrangement of the elements on the circumference is supposed, a parameter corresponding to the rotation angle of the beam incidence position from this reference line) is calculated from PSD (0) and PSD (1), and likewise, angle information P2 corresponding to the incidence position of the second beam is calculated from PSD (2) and PSD (3). Also, if it is wider, it is judged that the center of the beams is between PSD (1) and PSD (2), and a position P1 is calculated from PSD (1) and PSD (2) and a position P2 is calculated from PSD (3) and PSD (0). Here, position data are positive integers from 0 to 1023, and when for example, the interval between PSD (0) and PSD (1) when a position inputted to PSD (0) and PSD (1) strides between 1023 and 0 is to be found, the interval exceeds 30 as a matter of course even if the actual interval is 30 or less. So, the order of substraction is predetermined so that when the position strides between 1023 and 0, the difference may assume a negative value without fail, and if the result is negative, 1024 is added. When for example, PSD (0) and PSD (1) are 1020 and 10, respectively, the interval is 14.

Also, the angle information P1 and the angle information P2 are the center of the pulse edge of CP, and a value obtained by adding up two edge positions and dividing the result by 2 is the beam rotation angle. When the above-mentioned two values added up stride between 1023 and 0, correction calculation is necessary after the addition of the two values.

The correction calculation is to further add 1024 to the added value and then divide the result by 2, and obtain the remainder after the result is divided by 1024. Consider, for example, the addition of 10 and 1020. When they are added up, the result is 1030, and when this is simply divided by 2, the result is 515, and it is not between 1020 and 10. So, when 1024 is added and then the result is divided by 2, the result is 1027. The remainder after this is divided by 1024 is 3, and thus the beam incidence position to be obtained is 3. Likewise, in the case of 525 and 546, if these are simply added up and the result is divided by 2, the result is 535.5 and a value between 525 and 546 can be obtained.

In this manner, two beam incidence positions are detected, and the beam rotation angle is calculated by the use of the angle information P1 and the angle information P2. FIG. 26 is a flow chart showing the calculation of the beam rotation angle. First, the angle information P1 and the angle information P2 are added up to thereby obtain angle information P0. While in the above description of the angle information P1 and the angle information P2, calculation has been done with all of them as positive integers, a calculation is done here with the angle information P1, the angle information P2 and the angle information P0 as binary numbers with signs of 10 bits. (The angle information P1 and the angle information P2 may sometimes include decimal fractions, but a case where the decimal fractions are discarded or counted as whole numbers or calculation is done with them extended to 11 bits can be selected. In the present embodiment, they are rounded into 10 bits and used.) Thereupon, what have been calculated as positive integers from 0 to 1023 are calculated as integers with signs from −512 to +511. At this time, there is no change in the expression of the binary numbers of the angle information P1 and the angle information P2, and calculation is done with (1111111111) which is the binary expression of 1023 simply read as −1 as the complement form of 2. Thereupon, the position P0 is a value within the range of −512 to +511. Next, whether the position P0 has overflowed is checked up. Here, the overflow or underflow of the angle information P0 does not mean that the calculation of P1+P2 has overflowed, but refers to a case where as compared with the value of the angle information P0 at the last time, the sign of the value of the angle information P0 at this time differs.

Overflow refers to a case where the sign of the angle information P0 at the last time is positive and the sign of the angle information P0 at this time is negative, and the converse thereof is underflow. That is, each time the value of the angle information P0 makes one full rotation, the variable PC is upped and downed and how many full rotations the value of the angle information P0 has made is managed. Next, the variable PC is 0 to 3 at this time and therefore, if the variable PC overflows and becomes 4, the variable PC is rendered into 0, and if the variable PC underflows and becomes −1, the variable PC is rendered into 3.

Figure 28:
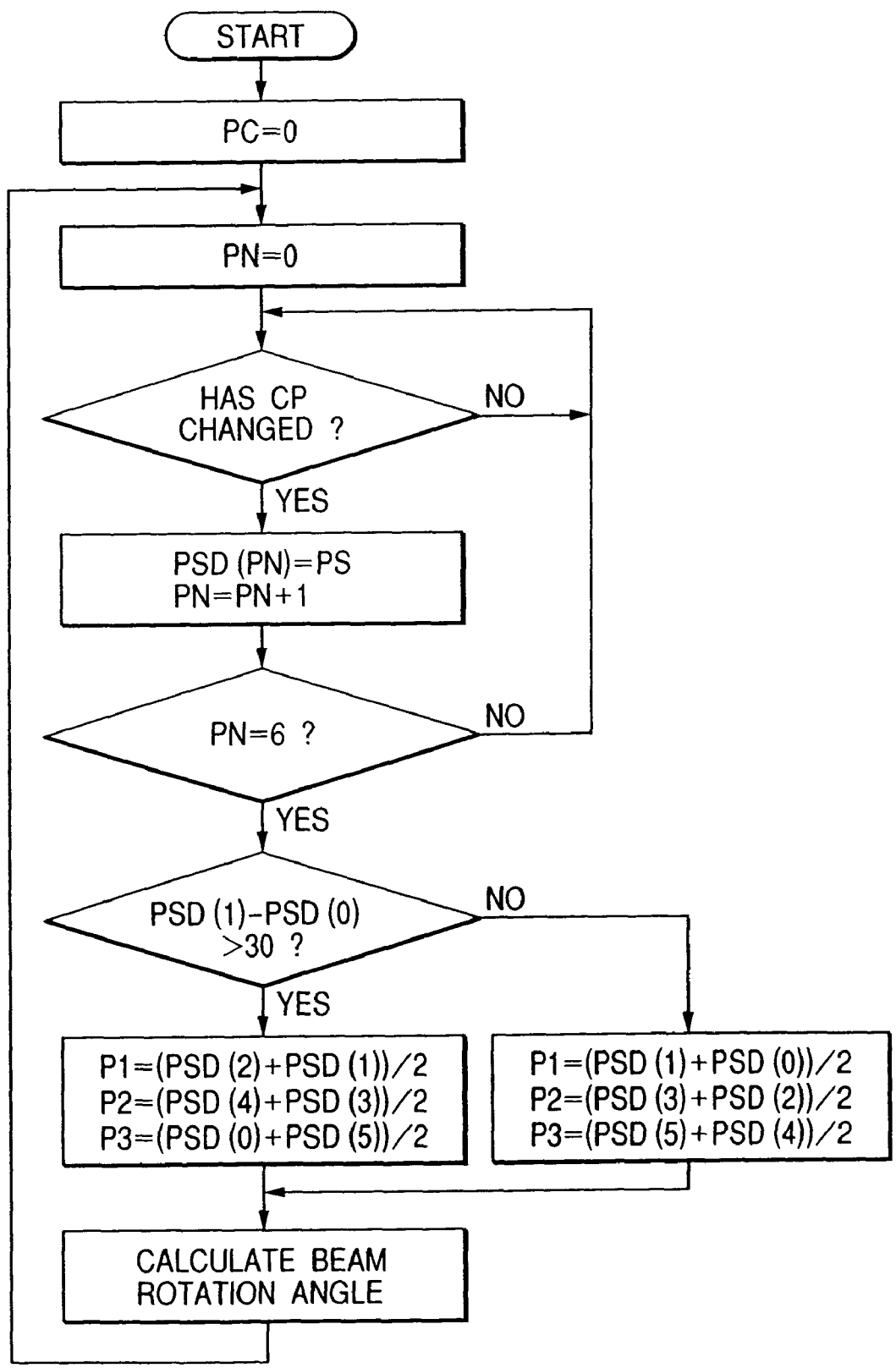
FIG. 28 is a flow chart 3 illustrating the operation of the seventh embodiment.
Figure 29:
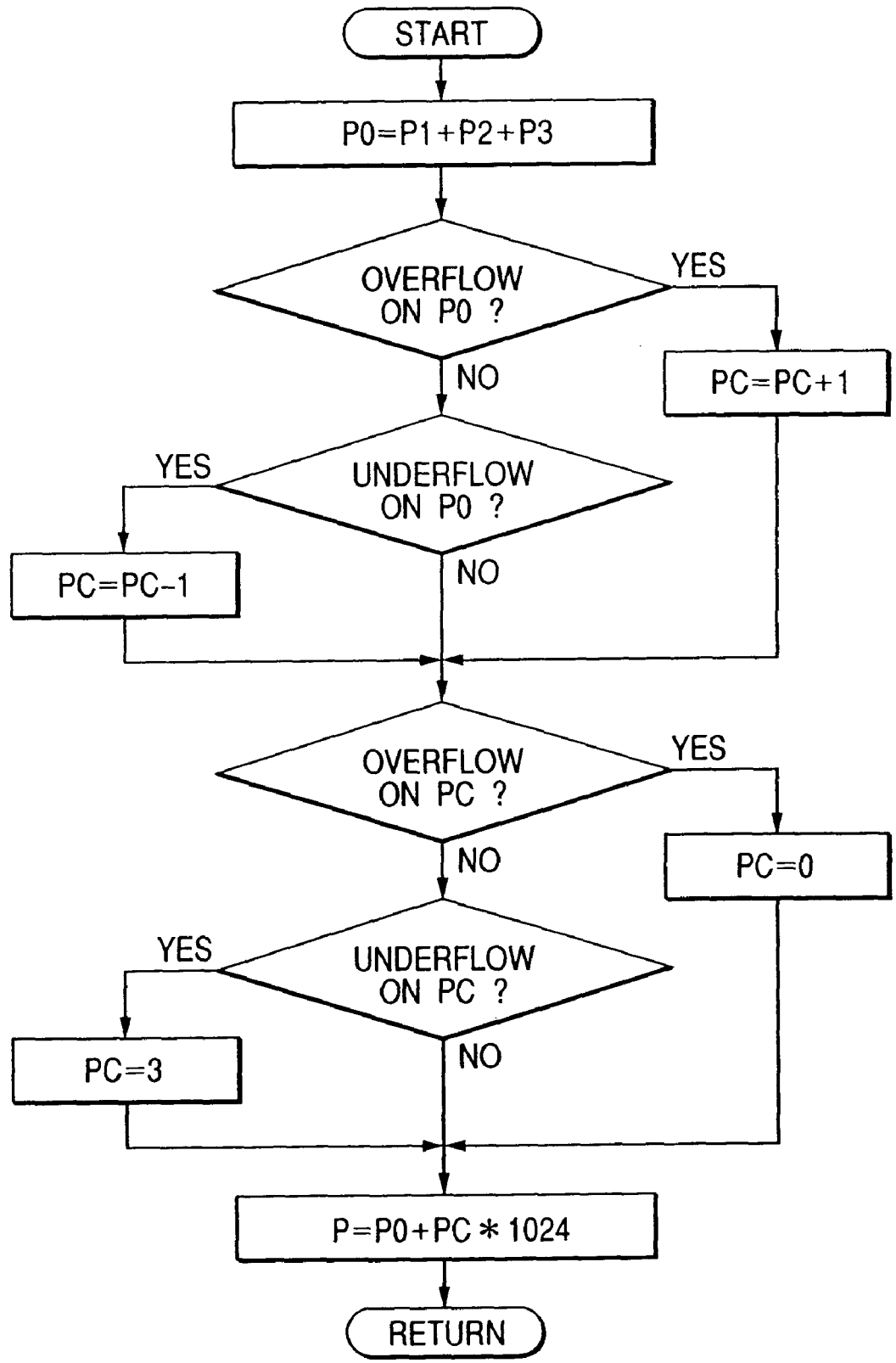
FIG. 29 is a flow chart 4 illustrating the operation of the seventh embodiment.

Lastly, the beam rotation angle P is calculated from the variable PC and angle information P0 obtained in this manner. Here, the angle information P0 is re-read from the binary number with a sign into a binary number without a sign and the variable PC is made 1024 times as great and then is added to the angle information P0. FIGS. 28 and 29 are flow charts showing the calculating method when the number of beams is three. Basically, this method is the same as the above-described content, but differs from the latter in that the number of beams is increased by one and therefore the variable PN is increased by 2 and the beam incidence positions are increased by one and the angle information becomes P3, and the angle information P0 has become one in which the angle information P1, the angle information P2 and the angle information P3 have been added up. Also, while in the present embodiment, the value of the counter 30 is reset by the CPU 35, design may be made such that after a beam position is detected, the next beam position is foreseen and the count value of the counter 30 is reset so that the scanning position may be skipped to a position near the foreseen next beam position. Also, while in the present embodiment, the light receiving elements of the light receiving sensor 1 are clockwisely selected in order, design may be made such that the light receiving elements are alternately selected as in the interlace scan system of TV wherein every other light receiving element is selected and after one round, every other portion which has not been selected is selected in order.

Figure 30:
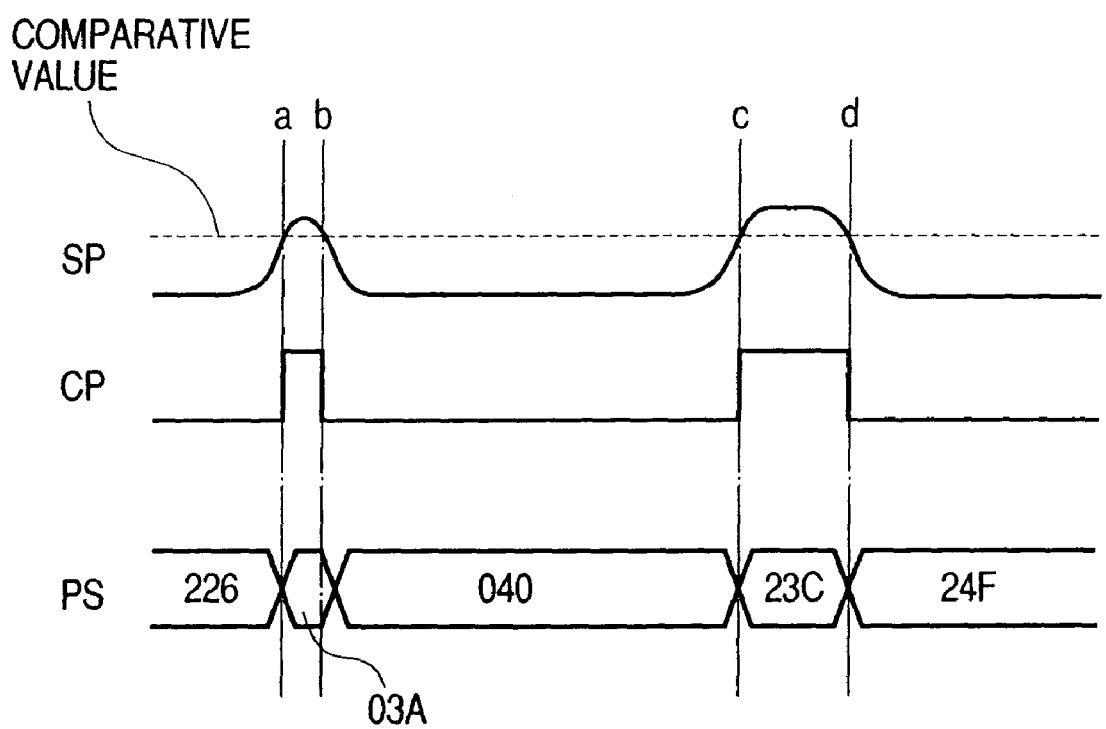
FIG. 30 is a timing chart 2 showing the signal waveform of each portion of the seventh embodiment.

In such a system, the entire circumference of the light receiving sensor 1 can be scanned at a high speed, and this is effective when the beam is rotating at a high speed. As described above, design may be made such that depending on the rotating speed of the beam, the number of skips is changed over or the scanning method is changed over. Also, while here has been shown an example in which all the light receiving elements of the light receiving sensor 1 are scanned in two rounds, design may be made such that they are scanned in three or more rounds. Also, while the present embodiment has been described with respect to a case where the quantities of light of two beams or the spot diameters of the beams are the same, the same thing applies even when the quantities of light differ from each other. As regards the signal of each portion in this case, as shown in FIG. 30, the pulse width of the signal CP differs greatly between the two beams and therefore, the respective beam positions can be specified and thus, the absolute angle of the beam rotation angle in one full rotation can be calculated.

Figure 31:
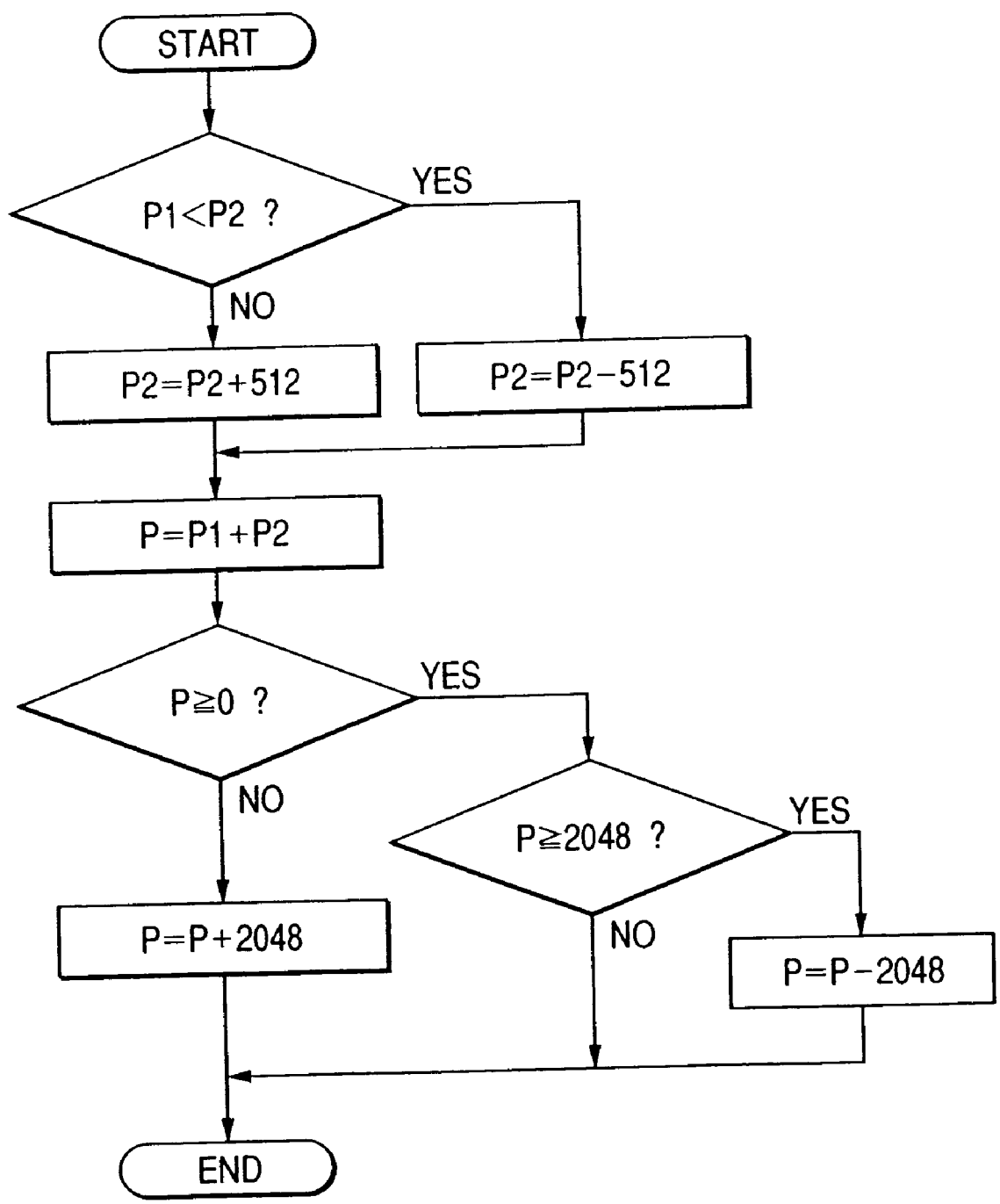
FIG. 31 is a flow chart 5 illustrating the operation of the seventh embodiment.

While in the above-described embodiment, carrying calculation has been effected for each half rotation by the use of the variable PC, calculation can also be effected without the use of the variable PC. FIG. 31 shows a specific calculation flow chart. First, on the assumption that the position P1 and the position P2 have been obtained by the above-described method, the calculation after that will be described. The position P1 and the position P2 are positive integers from 0 to 1023 here, and are the substantially opposed positions on the light receiving sensor 1 and therefore, there is a difference of nearly 512 between the angle information P1 and the angle information P2. First, the angle information P1 and the angle information P2 are compared with each other and if the angle information P2 is greater, 512 is subtracted from the angle information P2, and if the angle information P2 is smaller, 512 is added to the angle information P2.

Next, the angle information P1 and the angle information P2 are added up to thereby obtain beam incidence angle information (P). If at this time, the beam incidence angle information (P) is 2048 or greater, 2048 is subtracted from the beam incidence angle information (P), and if the beam incidence angle information (P) is smaller than 0, 2048 is added to the beam incidence angle information (P). Thus, the beam incidence angle information (P) of 0 to 2047 is obtained. If such a method is used, the rotation angle of the rotary member, not shown, can always be detected within the range of 0° to 360°, and if this is used, a compact absolute encoder can be realized.

Figure 20:
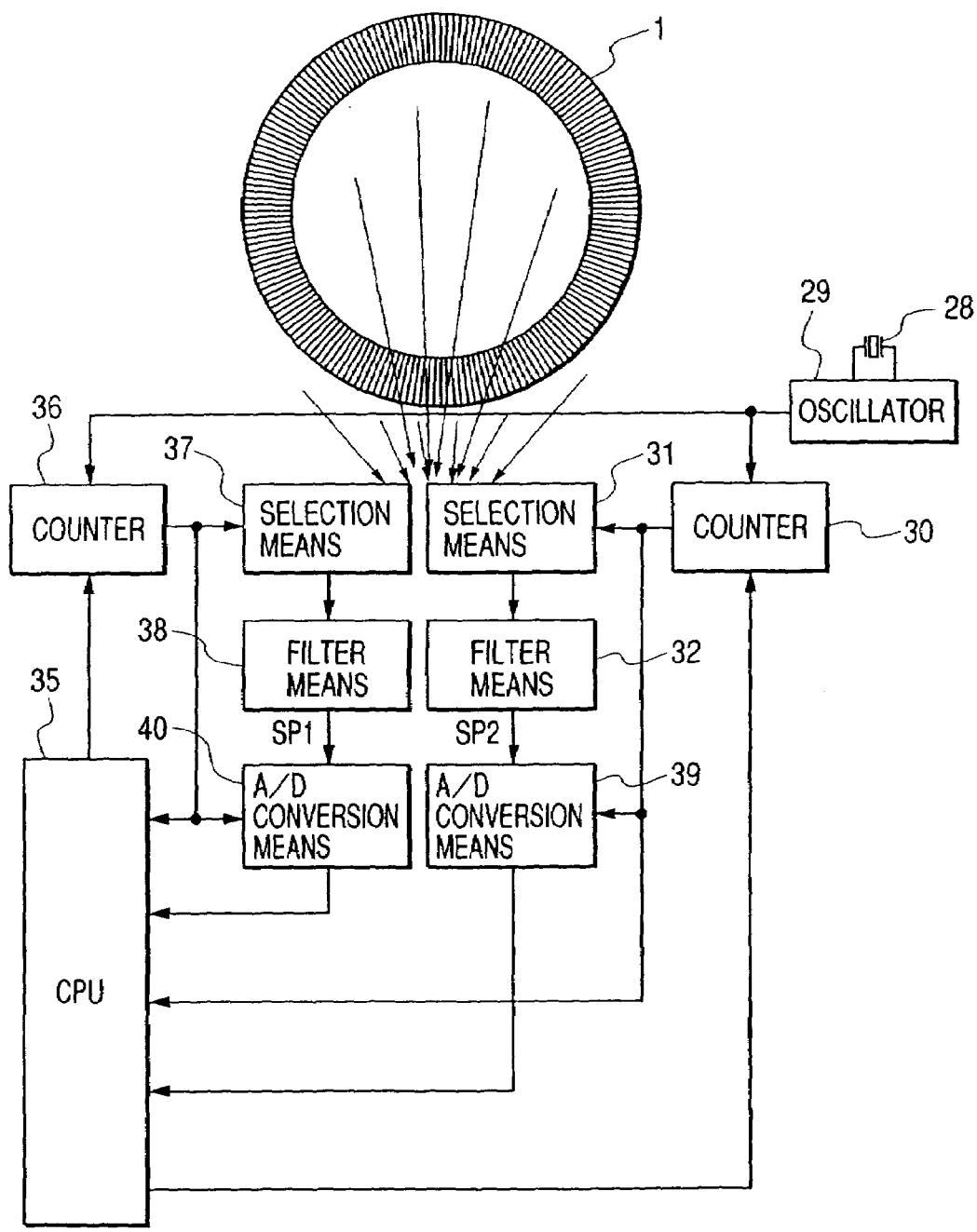
FIG. 20 is a block diagram of a rotation detecting apparatus according to an eighth embodiment of the present invention.

FIG. 20 is a block diagram showing an eighth embodiment. In FIG. 20, the same elements as the elements shown in FIG. 19 are designated by the same reference numerals. While in the previous embodiment 7, one of the outputs of the light receiving elements of the light receiving sensor 1 is detected at a time, the present embodiment improves the simultaneousness of the outputs of the light receiving elements and is adapted to read the output voltage value of the light receiving sensor 1 into the CPU 35 and calculate it. The present embodiment typically shows an example in which the outputs of two light receiving elements are detected at the same time, and the outputs of more light receiving elements may be detected at the same time.

In FIG. 20, reference numeral 36 designates a counter for counting the output signal of the oscillator 29, and the count value thereof is preset by a signal from the CPU 35. The CPU 35 has the function of address producing means for producing addresses corresponding to the light receiving elements from the vicinity of the incidence positions of the beams. Reference numeral 37 denotes selection means for selecting from the outputs of the plurality of light receiving elements of the light receiving sensor 1 on the basis of the output value of the counter 36. Reference numeral 38 designates filter means for removing the noise of the output signal of the selection means 37, and reference numerals 39 and 40 denote A/D conversion means for A/D-converting the output signals of the filter means 32 and 38, respectively, after a predetermined delay time from the timing at which the count values of the counters (address producing means) 30 and 36 change.

Figure 32:
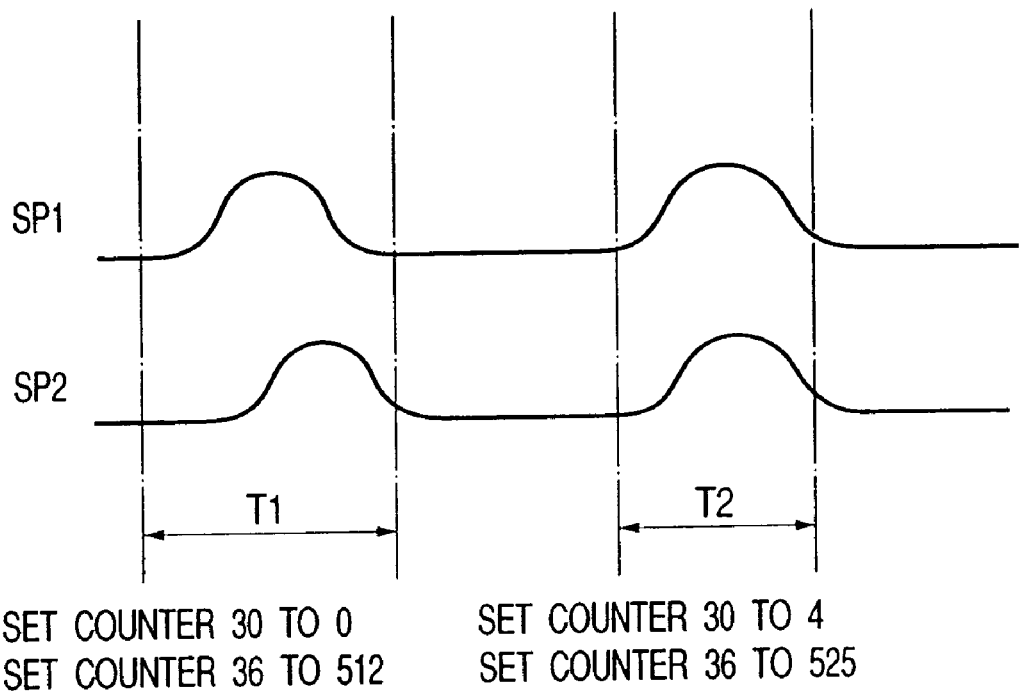
FIG. 32 is a timing chart showing the signal waveform of each portion of the eighth embodiment.

Two beams transmitted through the rotatable member 12 by the linear diffraction grating as shown in FIG. 7 enter the light receiving sensor 1. In that case, the beams enter the substantially opposed positions on the circumference of the light receiving sensor 1 and therefore, to detect these positions of the beams at a time, two or more light receiving elements must be detected at a time. FIG. 32 shows the waveform of each portion of the block diagram of FIG. 20.

SP1 and SP2 are the quantities of the beams incident on the light receiving sensor 1 which have been outputted with the light receiving elements on the light receiving sensor 1 changed over clockwisely, and the signal SP1 is the signal of a light receiving element near the light receiving element corresponding to the count value No. 0 of the light receiving sensor 1, and the signal SP2 is the signal of a light receiving element near the light receiving element corresponding to the count value No. 512. FIG. 32 shows the waveforms when the respective count values have been changed over in order after at first, 0 has been preset in the counter 30 and 512 has been preset in the counter 36, and with a time T1 taken, the signal data of the signal SP1 and the signal SP2 are A/D-converted and introduced into the CPU 35.

Since here, the positions of the mountain-shaped waveforms of the signal SP1 and the signal SP2 deviate from each other, the positions of the signals P1 and P2 cannot be detected at the same time. So, at the timing whereat the detection of the next beam incidence position is effected, 4 is preset in the counter 30 and 525 is preset in the counter 36, whereby signals are outputted from the vicinity of the rising of the mountain-shaped signals of the signal SP1 and the signal SP2 and the mountain-shaped signals of the signals SP1 and SP2 can be detected substantially at a time. As the result, the time necessary for detection is shortened and the positions (angle information) of the signals P1 and P2 substantially at the same time can be detected.

Also, while design is made here such that the substantially opposed positions on the light receiving sensor 1 are detected at the same time, design can be made such that if the number of beams is three, three locations are detected at every other 120° at the same time. Also, as specific methods of obtaining the beam incidence position, there is a method of obtaining a range in which the quantity of received light is greater than a predetermined threshold value as described above, and regarding the center thereof as the beam position, a method of averaging beam positions obtained with such several threshold values provided, a method of regarding the peaks of the mountain-shaped waveform as the beam position, a method of obtaining the center of gravity of the mountain-shaped waveform, etc.

Also, in some cases, the diameters of the beams are larger than a light receiving element and therefore, the beam positions cannot be deduced from a simply A/D-converted content. So, the quantities of received light by two adjacent light receiving sensors which are the results of A/D conversion inputted in succession may be successively compared with each other, and the point at which the magnitude relation therebetween is reversed may be regarded as the beam incidence position, or the quantity of light between the light receiving elements may be determined from the quantities of light before and after it by an interpolation technique such as linear interpolation. Consequently, the center of gravity of the quantity of light or the peak position of the quantity of light may be obtained precisely.

Figure 21:
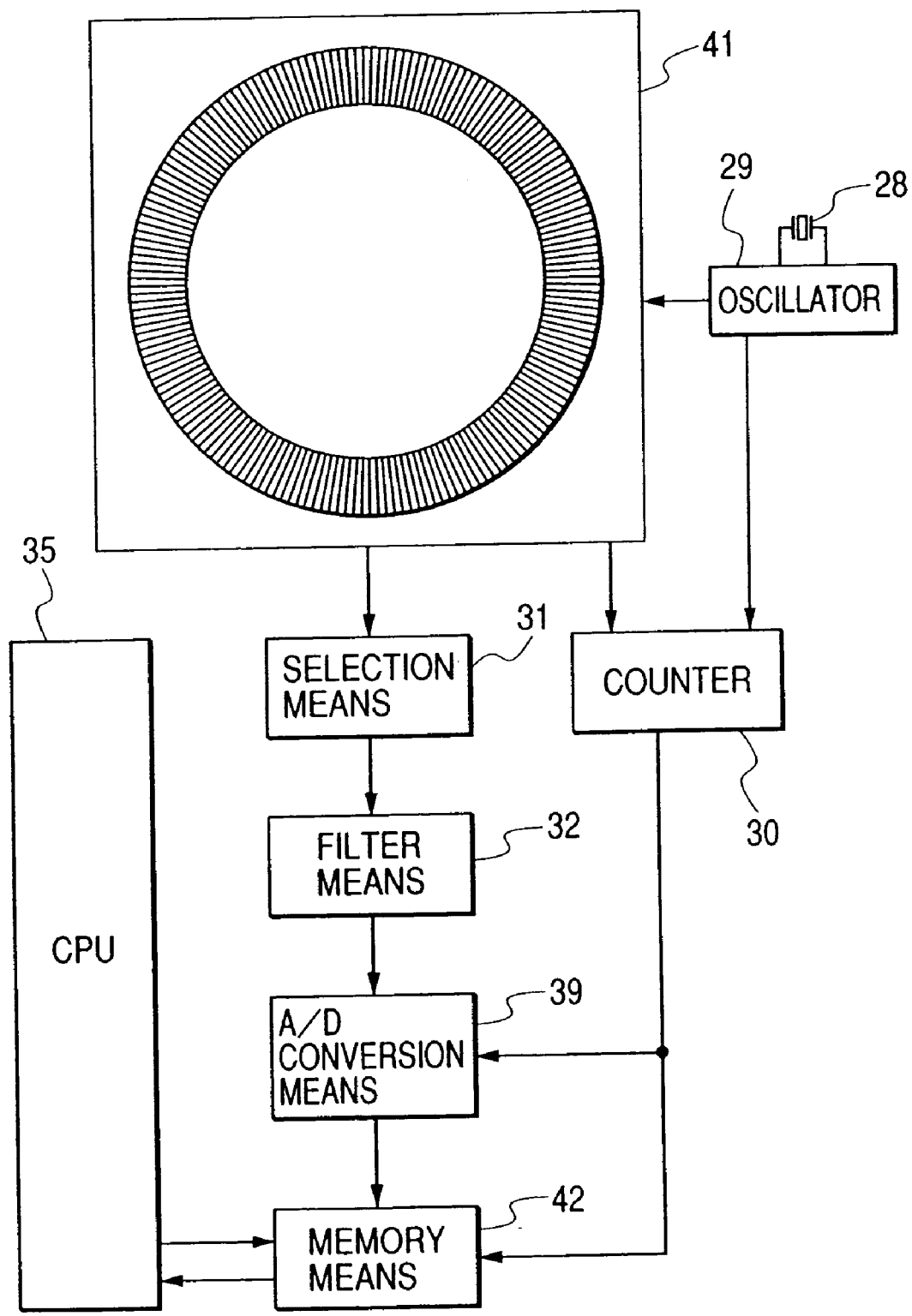
FIG. 21 is a block diagram of a rotation detecting apparatus according to a ninth embodiment of the present invention.

FIG. 21 is a block diagram showing a ninth embodiment. In FIG. 21, the same elements as the elements shown in FIG. 19 are given the same reference characters. In FIG. 21, reference numeral 41 designates a conventional CCD having light receiving elements provided in a ring shape. The CCD 41 is designed such that the outputs of the ring-shaped light receiving elements are put out in a clockwise order in synchronism with the output signal of the oscillator 29, and has the function of output means.

A synchronizing signal is outputted when a signal corresponding to a predetermined light receiving element is outputted. This synchronizing signal is designed to be inputted to the counter 30 so that the count value thereof may be reset. Reference numeral 42 denotes memory means for storing the output value of the A/D conversion means 39 in an address corresponding to the count value of the counter 30. Let it be assumed that a plurality of beams are incident on the CCD 41 and are rotating on the ring-shaped light receiving elements.

The CCD 41 changes over the light receiving elements in order along the ring and outputs signals corresponding to the quantities of received light of the light receiving elements in synchronism with a pulse signal from the oscillator 29. The CCD 41 is of such structure that it charges a respective capacitor with charges outputted from the respective light receiving elements at the same time and takes out them in order at each predetermined timing and therefore, all the outputted signals are data at the same time. The CCD 41 resets the counter 30 at the start of data outputting, and starts to successively output signals corresponding to the quantities of received light of the respective light receiving elements in synchronism with the pulse signal from the oscillator 29.

These signals have their noise of high frequency component removed by the filter means 32 and are A/D-converted by the A/D conversion means 39, and thereafter are stored in the memory means 42. At that time, the signals are stored in the address corresponding to the count value of the counter 30, and are read from the CPU 35 as a quantity of received light corresponding to the address. The CPU 35 calculates a plurality of beam incidence positions on the basis of the data read from the memory means 42, and obtains the beam rotation angle. Here, to specify the beam as described in Embodiment 7, the quantity of light between the beams can be changed, and be judged from the difference in the peak of the quantity of received light and the size of an area in which the quantity of received light is greater than a predetermined quantity of received light.

Also, as other methods of specifying the beam, if the CCD 41 is made into an element corresponding to a color and the color of the beam is changed, the beam can be specified by the color, and besides this, there is a method of using a polarizing filter to specify the beam by the difference in polarization angle. Only one of the plurality of beams need be specified.

If one beam can be specified, the other beam positions can be specified because they are substantially predetermined positions, and an absolute beam rotation angle can be detected from this position information. Thereby, even when provision is made of a power saving circuit for cutting off a power source during stoppage, it is not necessary to memorize the beam rotation angle before the power source is cut off and therefore, a reduction in cost and the saving of the space for the circuit can be achieved. Conversely, in the case of a construction in which the beams cannot be specified, if the beam rotation angle immediately before the power source is cut off is stored in non-volatile memory means such as a flash memory or SRAM backed up by a battery, an absolute beam rotation angle can be outputted in a pseudo fashion.

Figure 22:
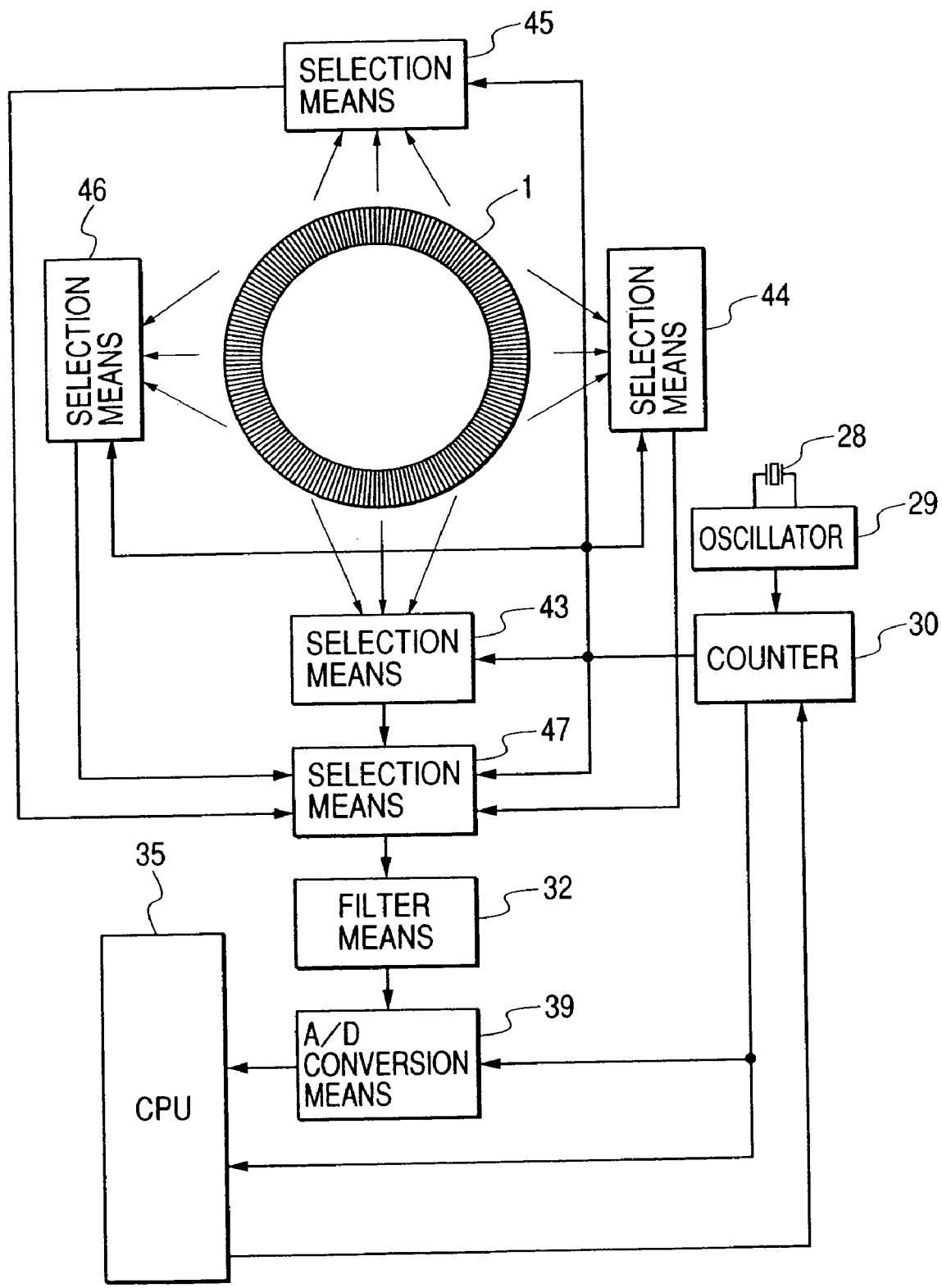
FIG. 22 is a block diagram of a rotation detecting apparatus according to a tenth embodiment of the present invention.

FIG. 22 is a block diagram showing a tenth embodiment. In FIG. 22, the same elements as the elements shown in FIG. 19 are given the same reference characters. This embodiment shows an example in which selection means are stepwisely provided. To select all the light receiving elements of the light receiving sensor 1 by a selection means, wiring concentrates and becomes long and therefore, if an IC or the like is employed, wiring is difficult. So, design is made to curtail the wiring area by adopting a tournament form in which the light receiving element of the light receiving sensor 1 is divided into several compartments, and each of these compartments is selected by selection means and further, one is selected from the results of the selection.

In FIG. 22, reference numerals 43, 44, 45 and 46 designate selection means for selecting the outputs of the light receiving elements of the light receiving sensor 1 inputted in conformity with the count value of the counter 30. Reference numeral 47 denotes selection means for selecting one of the outputs of the selection means 43–46 in conformity with the output of the counter 30. If the selection means are thus provided near the light receiving elements, an IC chip surface can be effectively utilized if circuits such as the selection means are constructed in a circle surrounded by the light receiving elements of the ring-shaped light receiving sensor 1.

Figure 23:
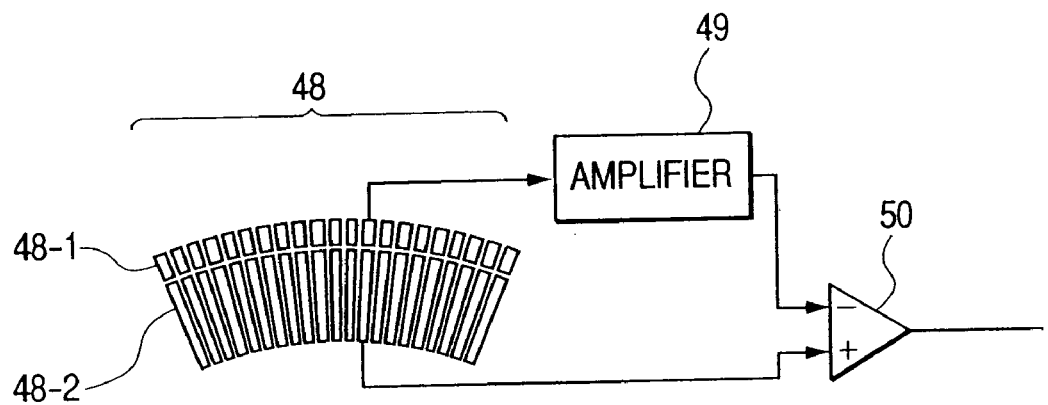
FIG. 23 shows a peripheral circuit example 1 of a light receiving element in an eleventh embodiment of the present invention.

FIG. 23 is a block diagram showing an eleventh embodiment. In FIG. 23, reference numeral 48 denotes a portion of a light receiving sensor constructed into a circular ring shape. The light receiving sensor 48 is divided into two compartments divided by a concentric circle, and an outer light receiving sensor 48-1 is used for offset level detection, and an inner light receiving sensor 48-2 is used for beam position detection.

The sensors 48-1 and 48-2 together constitute an element of offset level detecting means.

Here, the offset level refers to the amount of the other lights than the light to be detected, and is used with a view to improve the S/N ratio of the beam incidence position signal by subtracting this by a differential amplifier 50 which will be described later. This is also effective for the removal of electrical noise around the light receiving sensor 48 when the output of the light receiving sensor 48 is small. That is, if noise rides on the outer light receiving sensor 48-1 and the inner light receiving sensor 48-2 in the same way, the noise can be cancelled by taking a difference by the differential amplifier 50 which will be described later. Reference numeral 49 designates an amplifier which corrects the difference in the output sensitivity characteristic to the noise signals of the light receiving sensor 48-1 and the light receiving sensor 48-2.

Figure 24:
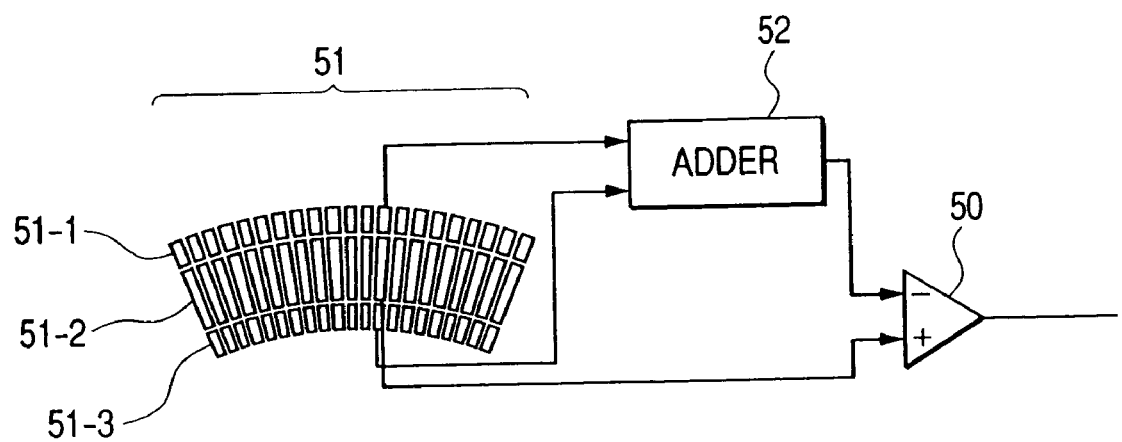
FIG. 24 shows a peripheral circuit example 2 of the light receiving element in the eleventh embodiment.

The differential amplifier 50 subtracts the output of the amplifier 49 which is the sensitivity-corrected output of the light receiving sensor 48-1 for offset level detection from the output of the light receiving sensor 48-2 for beam position detection. FIG. 24 is a block diagram showing a second example of the eleventh embodiment. Reference numeral 51 denotes a light receiving sensor, and the light receiving sensor 48 is divided into two compartments by a concentric circle, whereas the light receiving sensor 51 is divided into three compartments.

An outer light receiving sensor 51-1 and an inner light receiving sensor 51-3 are used for offset level detection, and a light receiving sensor 51-2 (a sensor in the compartment between 51-1 and 51-3) is used for beam incidence position detection. The total area of the light receiving surfaces of the light receiving sensors 51-1 and 51-3 for offset level detection and the total area of the light receiving surface of the light receiving sensor 51-2 for beam incidence position detection are substantially equal to each other, and when uniform light is incident on the whole surface of the light receiving sensor, the total output of the light receiving sensors 51-1 and 51-3 for offset level detection and the total output of the light receiving sensor 51-2 for beam incidence position detection become equal to each other and thus, the necessity of the amplifier for sensitivity correction can be eliminated.

Figure 33:
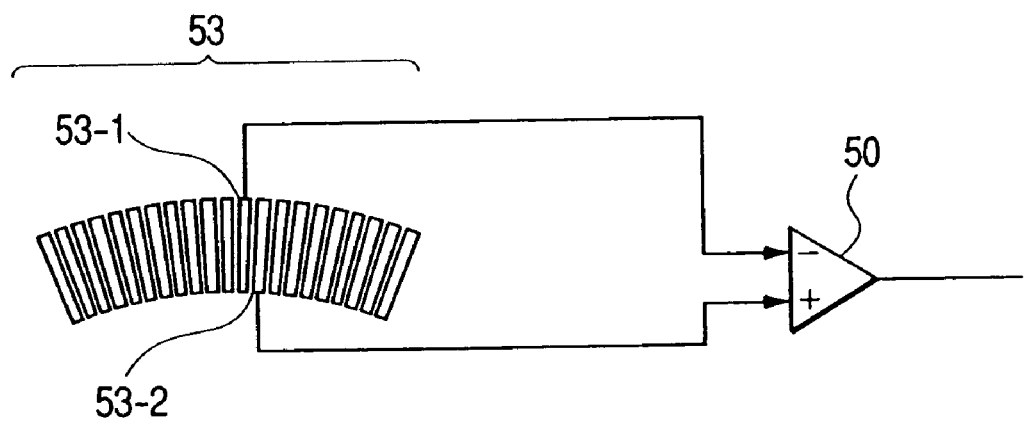
FIG. 33 shows a peripheral circuit example 3 of the light receiving element in the eleventh embodiment.

Next, reference numeral 52 designates an adder for adding up the outputs of the light receiving sensor 51-1 and the light receiving sensor 51-3, and the output of the adder 52 is subtracted from the output of the light receiving sensor 51-2 for incident beam incidence position detection by the differential amplifier 50. FIG. 33 is a block diagram showing a third example of the eleventh embodiment. Reference numeral 53 denotes a light receiving sensor, and the output signals of adjacent light receiving elements 53-1 and 53-2 in the light receiving sensor 53 are connected to the differential amplifier 50. By doing so, as described above, the S/N ratio is improved and also, the output of which of the two light receiving elements 53-1 and 53-2 is greater can be detected.

While in the block diagrams of FIGS. 23, 24 and 33, there is shown only the circuit of a light receiving element compartment present in the same angle compartments, such circuits are provided in or among all light receiving elements, and the circuits of the other angle compartments are of the same construction and therefore need not be shown and described.

As described above, the incidence positions of two or more beams moving while describing a circle or an arc are independently detected, and the angle of a straight line linking the respective positions together is detected, whereby even if there is a deviation between the position of the light receiving means and the centers of rotation of the beams, the rotation angles of the beams can be detected highly accurately.

By the shape of the light receiving means being made into a circular ring, the calculation of the angle can be effected easily.

The rotation angle can be digitally detected by a plurality of independent light receiving means provided along the circle or the arc.

The rotation angles of beams differing in rotation radius are independently detected by a plurality of light receiving sensors provided on two or more circumferences having different radii, whereby the detection of the rotation angles and the eccentricity correction thereof can be effected by the use of beams differing in turning radius.

A different beam is received in each of different angle areas, whereby the positions of beams having the same turning radius can be independently detected, and by the use thereof, eccentricity correction can be effected.

By selecting the angle areas in conformity with the angles of incidence of the beams, the positions of the beams having the same turning radius can be independently detected in all angle areas, and by the use thereof, eccentricity correction can be effected.

By selecting the difference in optical characteristics such as wavelength, power, deflection angle, light-emitting timing, the distribution of these characteristics or the like of at least two beams by the selection means, the rotation angle of the beam can be independently detected.

Provision is made of the beam rotation angle detecting apparatus described above, and a rotatable member rotatable relative thereto, and a beam entering this beam rotation angle detecting apparatus rotates with the rotation of the rotatable member, whereby the rotation angle of the rotatable member can be detected highly accurately without being affected by the eccentricity of the rotary shaft of the rotatable member.

At least two light emitting means are provided on the rotatable member, whereby a plurality of beams can be rotated without being affected by the eccentricity of the rotary shaft, and the rotation angle of the rotatable member can be detected highly accurately.

The centers of circles described by the beams and the centers of the light receiving sensors are made substantially coincident with each other, whereby the influence of the eccentricity of the beams and the light receiving means can be further reduced.

At least two light transmitting windows are provided in the rotatable member, whereby the light of an existing light emitting body such as natural light can be utilized to rotate a plurality of beams without being affected by the eccentricity of the rotary shaft, and the rotation angle of the rotable member can be detected highly accurately.

The spot diameter of the beam incident on the light receiving means can be made into a desired size by condensing means and a stop, whereby the position of the beam can be detected more accurately.

As light deflecting means for changing the direction of incidence of the beam incident on the beam rotation angle detecting apparatus, a reflecting portion, a refracting portion or a diffraction grating portion is provided on the rotatable member, whereby the beam can be rotated without being affected by the eccentricity of the rotary shaft, and the rotation angle of the rotatable member can be detected highly accurately by the beam reflected from the rotary member.

Provision is made of a beam rotation angle detecting apparatus, a rotatable member rotatable relative thereto and light deflecting means disposed on the rotatable member and comprising a plurality of continuous predetermined patterns having a reflecting surface or a refracting surface, whereby the beam can be refracted in any direction even when the rotatable member is made into a plate shape.

The direction of the beam is bent by a minute reflecting surface or refracting surface by a plurality of grooves or projections linearly provided in parallel to one another, whereby even if the beam impinges on any portion of the plate-shaped rotatable member, the beam can always be reflected or refracted in a direction conforming to the rotation angle of the rotatable member.

The direction of deflection of the beam is increased by the recess of a polygonal pyramid having a plurality of minute reflecting or refracting surfaces provided adjacent to one another in two or more directions, or the beam is deflected by a plurality of reflections or refractions, whereby the number of beams can be set arbitrarily and eccentricity correction can be effected more highly accurately.

Angle information corresponding to two or more incidence position data selected from among a plurality of beam incidence positions detected by the light receiving means is added by arithmetic means to thereby calculate an angle, whereby even if there is the eccentricity of the center of rotation of the beam and the center of the light receiving means, the deviation of the beam rotation angle by the influence of the eccentricity can be cancelled.

When beams having the same center and differing in turning radius are made to be incident on a plurality of light receiving means differing in radius, position information from the plurality of light receiving means is divided by a value corresponding to the turning radius of the beams, whereby the phenomenon that the influence received by the position information of the beam positions upon the eccentricity of the centers of the different light receiving means and the centers of rotation of the beams differs depending on the turning radius of the beams can be cancelled.

When the above-mentioned division is to be effected, at least one value thereof is rendered into 1, whereby the frequency of the division or the number of dividing circuits can be reduced.

The incidence positions are added up and thereafter the result is divided by the number of added incident beams, whereby the output of the light receiving means and the values of the incidence positions can be made into values within the same range.

The output of the light receiving means is made into a value divided in advance by the turning radius of the beams, whereby the dividing circuits are curtailed.

The position is detected in conformity with the ratio between quantities of light incident on adjacent two of the light receiving elements of the light receiving means, whereby the incidence position of the beam striding between the light receiving elements can be detected.

The beam incidence position can be detected at time division by output means for successively outputting the outputs of a plurality of independent light receiving elements in predetermined order at predetermined timing and detecting means for obtaining a plurality of beam positions from the result of this outputting and therefore, the plurality of beam positions can be detected with a small-scale circuit construction.

A plurality of beam positions can be detected at time division by address producing means for producing an address at predetermined timing and selection means for selecting a light emitting element corresponding to this address from among a plurality of independent light receiving elements and selecting and outputting the output signal of that light receiving element, with the aid of a simple construction.

The output of the address producing means is set so as to skip the detection of the other light receiving elements than those near a beam incidence position detected in advance on the basis of the beam incidence position, whereby the detection time for the beam incidence position can be shortened.

The beam rotation angle detecting apparatus comprises pulse generating means for generating a pulse signal of a predetermined frequency, a counter for counting this pulse signal, selection means for successively changing over and outputting the outputs of a plurality of independent light receiving elements on the basis of the value of this counter, filter means for removing a signal of the predetermined frequency component from the output signal of the selection means, comparison means for comparing the magnitude of the output signal of the filter means with a predetermined value, detecting means for detecting the value of the counter at the changing point of the output signal of the comparison means, and arithmetic means for calculating angle information corresponding to the beam incidence position by the use of the result of the detection by the detecting means, whereby beam angle information can be converted into digital information by a simple circuit construction.

Arcuate or circular ring-shaped light receiving means is divided by a plurality of concentric circles, at least one of the compartments is offset level detecting means and at least one of the other concentric circle compartments is beam incidence position detecting means, and the difference between the output of the offset level detecting means and the output of the beam incidence position detecting means is outputted, whereby the other steady lights than the beam to be measured and the influence of electrical noise can be cancelled.

The offset level detecting means is provided with a mask for intercepting light, whereby it can cancel only the electrical noise.

What is claimed is:

1. A rotation detecting apparatus comprising:
   two members rotatable relative to each other, at least one of said two members forming on the other member at least two beams moving on concentric circles while forming a track as a circle or an arc in conformity with a relative rotation of said two members;

a light receiving portion provided on said other member, said light receiving portion detecting incidence positions of said at least two beams; and an arithmetic system for calculating angle information respectively corresponding to at least two incidence positions selected from among a plurality of light incidence positions detected by said light receiving portion, calculating corrected angle information in which a decentered amount of a beam is corrected by adding the calculated angle information, calculating and outputting the angle between a straight line linking together at least two incidence positions detected by said light receiving portion and a predetermined reference line based on the calculation results, and detecting information concerning the relative rotation of said two members based on the output angle.

2. The apparatus of claim 1, wherein said one member has at least two light emitting portions for producing the beams moving along the circle or arc.

3. The apparatus of claim 2, wherein said at least two light emitting portions are disposed so that the centers of rotation of the beams moving along the circle or arc may coincide with the center of said light receiving portion.

4. The apparatus of claim 1, wherein said one member has at least two light transmitting windows for the incident light from the back side of said member to the said beams moving along the circle or arc.

5. The apparatus of claim 1, further comprising a condensing optical system or an orifice for making said at least two beams into light spots on said light receiving portion.

6. The apparatus of claim 1, wherein said one member has light deflecting means for changing the direction of incidence of the beams incident on said light receiving portion with the rotation of said one member.

7. The apparatus of claim 6, wherein said light deflecting means has at least two reflecting members.

8. The apparatus of claim 6, wherein said light deflecting means has at least two refracting members.

9. The apparatus of claim 6, wherein said light deflecting means has a diffraction grating.

10. The apparatus of claim 6, wherein said light deflecting means is formed with a plurality of patterns of a predetermined cross-sectional phase forming a reflecting surface forming a predetermined angle with respect to the relative rotation plane of said one member, said patterns being continuously formed in parallel with the rotation plane.

11. The apparatus of claim 10, wherein said patterns of the predetermined cross-sectional shape are linear grooves or projections, or at least triangular polygonal pyramidal recesses.

12. The apparatus of claim 6, wherein said light deflecting means is formed with a plurality of patterns of a predetermined cross-sectional shape forming a refracting surface forming a predetermined angle with respect to the relative rotation plane of said one member, said patterns being continuously formed in parallel with the rotation plane.

13. The apparatus of claim 12, wherein said patterns of the predetermined cross-sectional shape are linear grooves or projections, or at least triangular polygonal pyramidal recesses.

14. A rotation detection apparatus comprising:

a first member and a second member disposed rotatable relative to each other;

a light source fixed with respect to the first member;

light deflection means provided on the second member, for deflecting a beam from the light source into at least two directions in accordance with relative rotation with respect to the first member, and forming two beams of which illuminating points rotate on concentric circles to form a circle or an arc;

a ring-like sensor which is provided on the first member and receives the two beams; and arithmetic means which calculates rotation angles of two beams, wherein a decentered amount between a rotation center of the two beams and a center of the ring-like sensor is corrected.

15. The apparatus of claim 14, wherein said light deflection means has at least two reflecting members.

16. The apparatus of claim 14, wherein said light deflection means has at least two refracting members.

17. The apparatus of claim 14, wherein said light deflection means has a diffraction grating.

18. The apparatus of claim 14, wherein said light deflection means is formed with a plurality of patterns of a predetermined cross-sectional shape forming a reflecting surface forming a predetermined angle with respect to the relative rotation plane of said second member, said patterns being continuously formed in parallel with the rotation plane.

19. The apparatus of claim 18, wherein the patterns of a predetermined cross-sectional shape are linear grooves or projections, or recesses of at least triangular pyramidal shape.

20. The apparatus of claim 14, wherein said light deflection means is formed with a plurality of patterns of a predetermined cross-sectional shape forming a refracting surface forming a predetermined angle with respect to the relative rotation plane of said second member, said patterns being continuously formed in parallel with said rotation plane.

21. The apparatus of claim 20, wherein said patterns of a predetermined cross-sectional shape are linear grooves or projections, or recesses of at least triangular pyramidal shape.

22. A rotation detection apparatus according to claim 14, wherein a rotation axis of relative rotation of the first member and the second member is different from the rotation center of the two beams.

23. A rotation detection apparatus comprising:

a first member and a second member disposed rotatable relative to each other;

a light source fixed with respect to the first member;

light deflection means provided on the second member, for deflecting into at least two directions a beam from the light source in accordance with relative rotation with respect to the first member, and forming two beams on which illuminating points rotate on concentric circles to form a circle or an arc;

a two-dimensional position sensor which is provided on the first member, receives the two beams, and detects an incident position; and arithmetic means which calculates an angle formed between a straight line linking together two incident positions of the two beams on the two-dimensional position sensor and a predetermined reference line.

24. The apparatus of claim 23, wherein said light deflection means has at least two reflecting members.

25. The apparatus of claim 23, wherein said light deflection means has at least two refracting members.

26. The apparatus of claim 23, wherein said light deflection means has a diffraction grating.

27. The apparatus of claim 23, wherein said light deflection means is formed with a plurality of patterns of a predetermined cross-sectional shape forming a reflecting surface forming a predetermined angle with respect to the relative rotation plane of said second member, said patterns being continuously formed in parallel with the rotation plane.

28. The apparatus of claim 27, wherein said patterns of a predetermined cross-sectional shape are linear grooves or projections, or recesses of at least triangular pyramidal shape.

29. The apparatus of claim 23, wherein said light deflection means is formed with a plurality of patterns of a predetermined cross-sectional shape forming a refracting surface forming a predetermined angle with respect to the relative rotation plane of said second member, said patterns being continuously formed in parallel with said rotation plane.

30. The apparatus of claim 29, wherein said patterns of a predetermined cross-sectional shape are linear grooves or projections, or recesses of at least triangular pyramidal shape.

31. A rotation detection apparatus according to claim 23, wherein a rotation axis of relative rotation of the first member and the second member is different from the rotation center of the two beams.

* * * * *

UNITED STATES PATENT AND TRADEMARK OFFICE
CERTIFICATE OF CORRECTION

PATENT NO. : 6,958,468 B2  Page 1 of 1
DATED : October 25, 2005
INVENTOR(S) : Kenichi Kataoka It is certified that error appears in the above-identified patent and that said Letters Patent is hereby corrected as shown below:

<u>Column 4,</u>
Line 48, "does'" should read -- does --.

<u>Column 16,</u>
Line 10, "out them" should read -- them out --.

Signed and Sealed this

Thirteenth Day of June, 2006

JON W. DUDAS
*Director of the United States Patent and Trademark Office*